United States Patent
Yang et al.

(10) Patent No.: US 8,712,908 B2
(45) Date of Patent: Apr. 29, 2014

(54) HOME APPRECIATION PARTICIPATION NOTES

(75) Inventors: Tyler T. Yang, Rockville, MD (US); Henry J. Cassidy, Arlington, VA (US)

(73) Assignee: Habitat Economics, LLC, Rockville, MD (US)

( * ) Notice: Subject to any disclaimer, the term of this patent is extended or adjusted under 35 U.S.C. 154(b) by 933 days.

(21) Appl. No.: 12/436,891

(22) Filed: May 7, 2009

(65) Prior Publication Data

US 2010/0005019 A1 Jan. 7, 2010

Related U.S. Application Data

(60) Provisional application No. 61/129,508, filed on Jul. 1, 2008, provisional application No. 61/142,578, filed on Jan. 5, 2009.

(51) Int. Cl.
*G06Q 40/00* (2012.01)
(52) U.S. Cl.
USPC .................................. 705/39; 705/38; 705/35
(58) Field of Classification Search
None
See application file for complete search history.

(56) References Cited

U.S. PATENT DOCUMENTS

| | | | | |
|---|---|---|---|---|
| 5,983,206 | A * | 11/1999 | Oppenheimer | 705/38 |
| 6,460,021 | B1 * | 10/2002 | Kirksey | 705/35 |
| 7,107,239 | B2 * | 9/2006 | Graff | 705/36 R |
| 7,516,099 | B2 * | 4/2009 | Schneider | 705/38 |
| 8,234,205 | B1 * | 7/2012 | Harrington et al. | 705/37 |
| 2002/0174046 | A1 * | 11/2002 | Mistretta | 705/36 |
| 2004/0158515 | A1 * | 8/2004 | Schoen | 705/35 |
| 2005/0108029 | A1 * | 5/2005 | Schneider | 705/1 |
| 2005/0262016 | A1 * | 11/2005 | Hill et al. | 705/39 |
| 2006/0015357 | A1 * | 1/2006 | Cagan | 705/1 |
| 2006/0089895 | A1 * | 4/2006 | Joye et al. | 705/35 |
| 2006/0184450 | A1 * | 8/2006 | Ely et al. | 705/38 |
| 2006/0293915 | A1 * | 12/2006 | Glenn et al. | 705/1 |
| 2008/0010181 | A1 * | 1/2008 | Infanger | 705/36 R |
| 2008/0091476 | A1 * | 4/2008 | Graff | 705/4 |
| 2009/0018975 | A1 * | 1/2009 | Geltner et al. | 705/400 |
| 2009/0037328 | A1 * | 2/2009 | Abuaf | 705/40 |
| 2012/0197684 | A1 * | 8/2012 | Storey | 705/7.32 |

OTHER PUBLICATIONS

Equity Finance Mortgages for Home Buyers: The Next Revolution to Housing Finance? Caplin, A., Gordon, A., Joye, C., Feb. 2004.*
Property Value Models, Palmquist, Jun. 2003.*
Equity Participation in Homeownership by Institutional Investors, Schafer, R., Oct. 1998.*

(Continued)

*Primary Examiner* — Linda Perry
(74) *Attorney, Agent, or Firm* — Rabin & Berdo. P.C.

(57) ABSTRACT

A method, computer program product and computer system for issuing and servicing a Home Appreciation Participation Note (HAPN) for a real estate property, which includes issuing an Participation Contract (PC) for the property to PC investors, where the PC has a value derived from a sharing formula based on a change of a proxy for the value of the property relative to an initial value of the proxy, and the proxy is independent of an actual current condition of the property (after the initial valuation); and issuing a HAPN Bond for the property to HAPN Bond investors, where the HAPN Bond has an initial value set as a sum of an amount paid for the PC and an amount paid for the HAPN Bond. Both the PC and the HAPN Bond represent claims on the property, and the HAPN Bond is a performance bond for the PC if the value of the PC is negative.

54 Claims, 8 Drawing Sheets

(56) References Cited

OTHER PUBLICATIONS

New affordable housing mortgage product wins trifecta of awards, Lending Central, Dec. 6, 2007.*

Shared Appreciation Mortgages: Lessons from the UK. Sanders, A., Slawson Jr. C., Jul. 2005.*

Equity Linked Notes: An Introduction to Principal Guaranteed Structures, Ali, A. M., Oct. 2002.*

Equtiy-Linked Notes an Introduction, Lehman Brothers Apr. 4, 2001.*

The Equity Sharing Manual, Sirkin. D.A., 2002.*

Off-Balance-Sheet Corporate Finance with Synthetic Leases Shortcomings and How to Avoid Them with Synthetic Debt, Graff. Richard 2001.*

Perspectives on Debt-and-Equity Decomposition for Investors and Issues of Real Estate Securities, Graff. Richard, 1992.*

Shared Equity Homeownership, Davis, J.E., 2006.*

Equity Participation in Homeownership by Institutional Investors, Schafer, R., 1998.*

Shared-Equity Mortgages, Housing Affordability, and Homeownership, Caplin, A., Carr, J.H., Pollock, F., Tong, Z.Y., Tan, K.M., Thampy, T., 2007.*

The Equity Sharing Manual, Sirkin, D.A., 2002.*

* cited by examiner

If Non-negative Payoff to Investors

IF Negative Payoff from PC

HOME APPRECIATION PARTICIPATION NOTES

BACKGROUND (1) Field of the Invention

This invention relates to the financing of real property, primarily residential housing. More specifically, the invention relates to a method or system for separating a real property investment into a consumption-oriented realty investment and an investment-oriented realty investment, and for creating documents, monitoring and reporting to effect this separation. This financing of real property can be realized in conjunction with standard forms of house financing.

(2) Background Information

Unlike most consumption goods, homeownership currently provides the bundled utilities of consumption and investment. Owning a home provides a basic human need for shelter. At the same time, compared to other goods such as cars, housing tends to appreciate over time, or at least to return the salvage value of the land even when the physical structure deteriorates. The owner's right to alienate the property at fair compensation makes ownership an investment. Modern real estate law and markets primarily have the consumption and investment utilities combined into a bundle of rights; it is separated only in the rental market but rarely in the homeownership market. This united bundle of rights forces households to choose either the purchase of both or neither utilities, thus creates a potential misallocation of the household's wealth. It is generally said that housing is the single largest investment of most households in their lifetimes. However, if given the option, some homeowners may choose to put the money that they use for their housing "investment" into other investment assets, for diversification or for other reasons. It is thus desirable to design better real property financing schemes that allow homeowners to separate their payment for the housing into a consumption-oriented component and an investment-oriented component.

One solution is to use equity participation approaches. Various equity participation approaches have been proposed and used to a limited extent that offer better mortgage terms in exchange for a participation in the equity of the house.

One type of such an instrument is the Shared Appreciation Mortgage (SAM). It provides lower interest rates and monthly mortgage payments in return for a specified share in any appreciation in the mortgaged house. Lenders would not compensate homeowners for any losses on the value of the house over the mortgage duration, beyond their exposure as lien holders. However, SAMs have found only limited usage. Among the difficulties was the so-called "moral hazards" of SAMs if the house value itself is used to measure the appreciation in value, which include the incentives of the homeowner under such a SAM contract to under-invest in the home because the SAM investor will take at least a percentage of the increase in value; and their attempt to have the final valuation lower than it otherwise would be, such as by fraudulent sales transactions and by replacing expensive chandeliers with cheap ones. Other difficulties includes keeping records of capital improvement expenditures and distinguishing these from maintenance expenditures, and also the risk of fraudulent invoices and canceled checks claiming more than was actually paid for any purported improvements. The disincentive to maintain or improve the house reduced the homeowners' enjoyment of their houses as well as reduced the return to investors. Another problem was the need to settle the arrangement at some finite point in time, which caused difficulties if the house was not sold prior to that time in arranging replacement financing that had to include the amount owed if the house value increased; and in paying for and relying on an appraisal of value of the house at the settlement date.

Variations of SAMs include the mortgage plans of Madden (U.S. Pat. Nos. 6,904,414 and 6,345,262, "Madden SAMs" hereafter). For sharing with the lender a fixed percentage of either the house price appreciation or the final appreciated value, a lower mortgage rate (possibly zero percent) is applied. There is potentially no maturity date on the payment on the appreciation portion of the mortgage, while the principal is amortized. The Madden SAMs are based on the amount loaned, and the payoffs represent the payment to the lender/investor. The Madden SAMs compute the appreciation of the house by using the value of the house itself, in particular, the sales price, resulting in a homeowner's lack of incentive to maintain and improve the home and the other moral hazards noted above. The mortgage plans of Madden are contemplated solely as a first-position lien.

Another variation of SAM is the Shared Appreciation Mortgage Loan Method of Jaffee (U.S. Patent Application 2008/0162336, "Jaffee SAM" hereafter). The Jaffee SAM has a zero borrower payment rate, but interest accrues at a fixed or variable rate and is paid upon maturity. The Jaffee SAM also has a fixed maturity, whereupon an appraisal determines the final value of the house, unless the house is sold prior to maturity.

A method for providing home equity financing without interest payments is proposed by Hansford (U.S. Patent Application 2008/0189204, "Hansford method" hereafter). The Hansford method has a zero-coupon lien and a shared appreciation component. The Hansford method anticipates negative house price appreciation, and the amount of principal owed to the investor is reduced, at most to zero, as a participation in the reduced value of the house when sold or the arrangement is settled. However, a major problem of the Hansford method lies in home improvements. When the homeowner wishes to make improvements, he or she must notify the investor, and the investor can offer to invest in the improvements or not. In either case, the investor offers terms for how the expenditures will alter the initial house price, which is the basis for computing the house price appreciation. If the homeowner does not accept the terms offered, he/she either does not make the home improvement or does, with no allowance for this expenditure in the calculation of the amount of appreciation to be shared. This is a very awkward way of dealing with improvements.

A full forwards and options market is discussed by Liu (U.S. Patent Application 2007/0244780). Homeowners can purchase downside protection and/or sell future appreciation in proportions to their liking in an envisioned full derivative market in real estate. Also, houses can be valued not by appraisals or sales prices, but by an index. The Liu index is derived as a price per square foot as determined by inference from the option pricing found in the contracts of about 200 to 300 of the Liu-type contracts, for a given area, such as a Zip code, or larger. The Liu proposal does not involve any liens on the property, nor have finite maturities, such as 3 to 5 years. Upon settlement, cash payments are made, either to or from the homeowner. Liu suggests that if the homeowner owes money to the investor, such as when the house price appreciates and she has sold off this appreciation to the investor, she finances it with a larger mortgage. This creates an incremental continuing mortgage payment.

Oppenheimer attempts to provide a solution to the problem of separating the consumption from the investment in homes (U.S. Pat. No. 5,983,206, "Oppenheimer" hereafter). Oppenheimer enables a prospective homeowner (mortgagor) to become both part borrower and part joint equity venture with the mortgagee. Whenever the prospective home purchaser applies for credit under the terms of the new mortgage, the invention determines the required down-payment and Section A and B principal to finance the purchase under assumptions of current market interest rates and projected increases in house prices.

In Oppenheimer, Section A represents conventional fixed-rate (or adjustable-rate mortgage) loans. The homeowner borrows part of the total principal required to finance the purchase from Section A. The homeowner makes monthly payments only on the Section A principal for the first years before completely paying off the Section A principal obligation.

Section B is issued together with Section A. Section B principal has two parts: debt and joint venture equity partnership (JVP). The debt principal represents the amount of capital contributed to the house financing by Section B (i.e., house price, less down payment and Section A principal). The debt principal remains unpaid until the Section A obligations are terminated, and is then paid off over the last years of the usual 20-year mortgage. The value of Section B's equity share increases over the life of the mortgage because Section A mortgage payments, by reducing the Section A principal, also increases the net equity of both joint venture partners: homeowner and the Section B holder. The Section B holder, as a true JVP, shares in the total value of the house, including any appreciation (or depreciation) in its value, at its equity percentage. In one embodiment, the value of the JVP share is calculated by using the percentage change in a local house price index as a proxy for the change in house value and multiplying the percent JVP share times this amount. If termination occurs within a certain time period from inception, there is an additional cap or limit calculation to assure that the total Section B return on investment does not exceed a stated maximum percent.

In Oppenheimer, the JVP shares in a pre-specified percentage of the entire sales price of the house (or as estimated by an appraisal). Therefore, the JVP needs to include contract provisions to limit the JVP investors to receive a "reasonable" return if there is an early termination of the contract. Another consequence of the sharing arrangement is that principal payments on the mortgage in Oppenheimer increases the homeowners' equity, and thus is shared with JVP investors. The debt is paid off in monthly payments over 10 years, after the mortgage is paid off over 15 years (although the precise number of each of these years can vary). Oppenheimer does not contemplate negative changes in the index. Under Oppenheimer, homeowners have to share the increase in house price for maintenance and improvement expenditures, so they are not as incented as they are without the Oppenheimer mechanism to make these types of expenditures and effort, nor are the moral hazards discussed above dealt with. Moreover, the debt in Oppenheimer is not a zero-coupon debt, because after the payoff of the mortgage, interest is assessed during the period of amortization of the debt. The planned playoff of the debt in Oppenheimer is by monthly payments over a short period of time.

SUMMARY OF THE INVENTION

A method, computer program product and computer system for issuing and servicing a Home Appreciation Participation Note (HAPN) for a real estate property, which includes issuing a Participation Contract (PC) for the real estate property to PC investors, where the PC has a value computed with a set of sharing formulae based on a change of a proxy relative to an initial value of the proxy, and the proxy is independent of an actual current condition of the real estate property (at least after the initial valuation); and issuing a HAPN Bond for the real estate property to HAPN Bond investors, where the HAPN Bond has an initial value set as a sum of an amount paid for the PC and an amount paid for the HAPN Bond. Both the PC and the HAPN Bond represent claims on the real estate property, and the HAPN Bond is a performance bond for the PC if the value of the PC is negative.

BRIEF DESCRIPTION OF THE DRAWINGS

The accompanying drawings, which are incorporated in and constitute a part of this specification, illustrate the various features and aspects of the invention and, together with the description, explain the advantages and principles of the invention. In the drawings.

DETAILED DESCRIPTION

Figure 1:
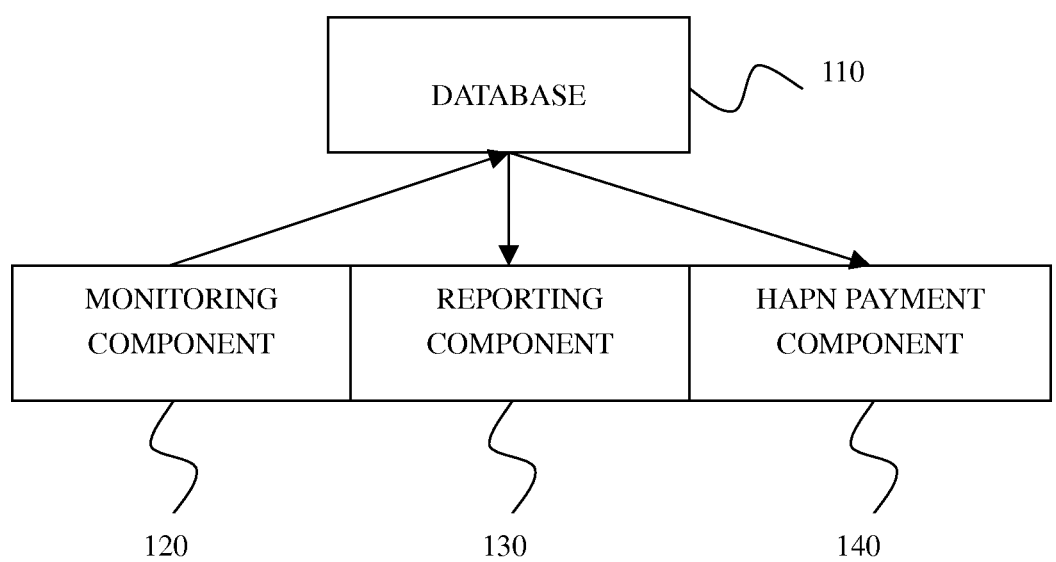
FIG. 1 is a block diagram of the components of a system for managing Home Appreciation Participation Notes (HAPNs)

Reference will now be made in detail to an implementation of the present invention as illustrated in the accompanying drawings. Wherever possible, the same reference numbers will be used throughout the drawings and the following description to refer to the same or like parts.

The invention is related to a system or method that processes information corresponding to House Appreciation Participation Notes (HAPNs), which are financial instruments that evidence the obligation of a homeowner to make payments that are triggered by certain events, primarily by the sale of the subject house. HAPNs are liens on real estate. The real estate could be residential or commercial. "House" or "home" herein is used to represent either residential or commercial real estate.

HAPNs are used to cede a portion of or all future house price appreciation in real estate. A HAPN is composed of two potentially separable contracts: a Participation Contract (PC) and a HAPN Bond. The owner of a house issues both the PC and the HAPN Bond to investors, and uses the sum that PC investors pay for the PC and HAPN Bond investors pay for the HAPN bond to help finance the house. The sum is set to equal to the initial value of the HAPN Bond. A PC and a HAPN Bond are often sold to the same investors together. The term HAPN refers collectively to both the PC and the HAPN Bond, whether packaged together or sold separately. The HAPN contract is the collective term for both the PC and the HAPN Bond contract; where the PC contains the terms and conditions regarding the sharing of the house appreciation with investors and any conditions that may affect that sharing, such as prepayments; and the HAPN Bond contract contains the terms and conditions pertaining to the repayment of the Bond.

I. The Participation Contract i. The House Price Appreciation Proxy

The appreciation for purposes of a Participation Contract (PC) is measured based on a house-independent appreciation proxy, which is independent from the actual current condition of the house, after the initial time (i.e. the time of the initiation of the PC). The initial valuation of the house uses the then-current attributes of the house, but subsequent valuations attempt to "hold constant" those initial attributes. The initial valuation may be an actual sales price, an appraised value, an estimated value from an Automated Valuation Model (AVM), or a combination of these. In a primary embodiment of the invention, the house-independent appreciation proxy is calculated using a Desk Valuation, which may be provided by a human (typically a licensed real estate appraiser) or by an AVM.

When a Desk Valuation is provided by appraisers, they estimate the current value of the house by comparing the original characteristics of the house, e.g., the number of bedrooms, square footage, etc, to current similar properties sold recently, making adjustments for variations in the characteristics or attributes of the comparable sold properties and the subject property. The distinction between an actual appraisal and a Desk Valuation conducted by an appraiser (often called a desk review) is that the property is not physically examined and the current attributes of the house are not taken into account. The reason not to examine the house is to "hold constant" the initial characteristics of the property and not to take into account what maintenance and improvements were actually done on the property over the course of the HAPN contract. Therefore, the moral hazards, which come into play when the actual house price is used or the current condition is taken into account to estimate the current value of the property, are avoided. Homeowners thus have the incentive to improve and maintain the property and to sell it for a price as high as possible, just as they do under traditional financing or if the property was completely clear of debt.

Alternatively, an AVM provides property valuations using statistical modeling combined with a database. The basic approach of AVMs is to estimate the relationship between observed house prices when houses are sold and the characteristics or attributes of the houses and their environment, and to use this estimated relationship to estimate the value of a house with observed characteristics. This is very similar to the desk review by an appraiser, except in some applications the current characteristic of the subject property may be used instead of the original characteristics. Such an AVM is called a "hedonic" model. Other AVM evaluations include using a repeat sales index (RSI). An RSI is produced by a statistical model that observes sales prices on the same house at two or more different points in time and, with a large number of such house price pairs in a given geographic area, imputes an average rate of house price appreciation (HPA) for the area for specified periods of time (e.g., for 3 months). It applies the estimated cumulative average HPA to the last sales price observation on the subject house to estimate its current value. Some AVMs may use a combination of a hedonic model and an RSI. The results of each of the hedonic and RSI estimates of current value are weighed, analyzed and then reported as a final estimate of value based on a requested valuation date.

In an alternative embodiment of the present invention, the house-independent appreciation proxy may be based on a selected index of house prices (HPI). The selected index is one regularly and reliably made available to the public, and it typically covers the geographic area wherein the house resides. Examples of the index include: the OFHEO house price index for metropolitan areas, the Radar Logic Daily™ Index, the S&P/Case-Shiller House Price Index for major metropolitan areas, and the S&P/GRA Commercial Real Estate Index.

The term "proxy" used hereafter refers to a house-independent appreciation measure based on either a Desk Valuation or an HPI (as a proxy for a standard house appreciation measure such as a sales price or an appraisal). In different embodiments of the invention, a proxy could be selected from a number of publicly available Desk Valuations or HPIs, or even with a combination of them. For example, a combination of AVMs and HPIs may be used to determine the HAPN claim at settlement, in the form of a formula such as a weighted average of the selected proxies. The use of proxies increases the marketability and poolability of the HAPN assets, because they eliminate the moral hazards and also provide investors with a method to provide periodic updates. In fact, in an alternative embodiment, an AVM may be used to provide periodic updates even if the settlement of the PC is based on a desk review.

In some embodiments, the proxy calculator, such as an AVM, undergoes improvements between the initial valuation and the settlement valuation used to compute the HPA for purposes of the HAPN. A Participation Contract specifies how these will be dealt with. For example, the updated version available at each point in time may be used to compute the proxy value. In another example, the original calculator/model is saved and used for all subsequent proxy updates, including the settlement. In another example, the last version available is used to re-compute the initial proxy value.

Proxies can be crafted differently in different embodiments of the invention. In one embodiment, when AVMs are used as the indicator of the investors' returns, the AVM uses the original house characteristics in computing the settlement value of the proxy (i.e. the value of the proxy at the settlement time) for the PC. In another embodiment, an appraiser estimates the value of the improvements that were added after the initiation of the contract, which are then deducted from the imputed settlement value of the proxy in calculating the settlement value of the proxy. In yet another embodiment, the current attributes of the house may be used to impute a base proxy value (i.e. the value of the proxy at some previous point in time, e.g. at a specified starting time). Then upon settlement this same set of attributes is used to estimate the settlement value of the proxy. In a different embodiment, the initial house price or a standard appraisal is used as the base proxy value. In the latter case, adjustments may be made for the condition and upkeep of the subject property relative to that of the neighborhood houses, so as to try to estimate value as if the house had the typical neighborhood upkeep. This reduces basis risk when a similar construct is used for the settlement valuation of the proxy.

ii. Sharing Formulae

The payoff of a Participation Contract is computed according to Sharing Formulae, calculated as follows. Let $I_t$ be the value of the proxy at time t ($0 \leq t \leq$ the settlement time s), and $I_0$ be the value of the proxy at the point in time agreed upon to initiate the calculation of the house price appreciation for the PC. The House Price Appreciation rate ($HPA_{t,0}$) at time t for purposes of the PC is computed as the proportional change in the proxy:

$$HPA_{t,0} = (I_t - I_0)/I_0 \qquad (1)$$

If $I_t$ is an HPI, then $I_0$ is the initial (base) value of the HPI. Let $H_0$ be the value of the house, as measured by a sales price, an appraised value or an AVM estimate, at time 0. If $I_t$ is an estimate of house value from a Desk Valuation, then $I_0$ may be $H_0$. Then the "imputed value" of the house at time t is computed as $$H_t = H_0 * (1 + HPA_{t,0}) \qquad (2)$$

The value of $H_t$ at the settlement time (i.e. when t=s) may fall into one of the three zones: a lower zone, a central zone, and an upper zone, which are defined by two "target" imputed house prices, $HT_{t,j}$, where j designates Upper or Lower, and is computed as follows:

$$HT_{i,j} = H_0 (1 + r_j)^t \qquad (3)$$

where j=U or L, for the upper and lower zones, respectively, and the $r_j$'s are annual (or some other periodic) rates of growth that define the boundaries of the upper and lower zones such that $$r_L \leq r_u \qquad (4)$$

Let the subscript s refer to the settlement date of the PC (i.e., the number of periods since time zero, when HPA begins to accumulate), then the settlement cash flow of the PC, CF(PC), is computed as follows:

$$CF(PC) = \begin{cases} D_L(H_s - HT_{s,L}), & \text{if } H_s \leq HT_{s,L} \\ D_C(H_s - HT_{s,L}), & \text{if } HT_{s,L} \leq H_s \leq HT_{s,U} \\ D_C(HT_{s,U} - HT_{s,L}) + D_U(H_s - HT_{s,U}), & \text{if } H_s \geq HT_{s,U} \end{cases} \qquad (5)$$

where $D_L$, $D_U$, and $D_C$ are the proportions paid to PC investors for outcomes in the Lower, Upper, and Central zones, respectively. These proportions could be the same, or they may differ by zone; for example, with $D_L=1.0$ (i.e., all incremental downside risk in this zone is borne by the PC investors), $D_C=0$ (i.e., there is no payoff when the imputed $H_S$ falls in the central zone), and $D_U=0.9$ (i.e., the PC investors are paid 90% of the difference between $H_S$ and $HT_{s,U}$). In another example, if $r_L=0$ and $r_U=1\%$, and all the D's are unity, then the PC investor takes on all the downside risk of HPA, receives zero rate of HPA (as computed by the selected proxy) up to a compounded rate of 1% (i.e. $r_U$), and then receives the entire incremental HPA above 1% (i.e. $r_U$). The flexibility thus provided by these formulas allows HAPNs to be constructed to meet the needs of diverse homeowners and investors.

A special case of these formulas is when $$r_L = r_U = r \text{ and } D_L = D_C = D_U = D \qquad (6)$$

Then Equation (5) can be simplified to $$CF(PC) = D(H_s - H_0(1+r)^s) \qquad (7)$$

In Equation (7), if D is set at 1.0 and r is set at 1.0%, the homeowner is guaranteed an HPA of 1 percent per year (or other specified time period) and the HAPN investors take the risk and reward of any deviations of the computed HPA from the 1% compounded rate. If D is set at 0.8 and r is zero; then investors take 80 percent of the risk and reward of HPA, and the homeowner takes 20 percent. The latter is an example of the simplest kind of sharing formula.

The equations (1)-(7) are called the "sharing formulae." They are used, as the particular parameters of the formulas are specified in the PC documents, to compute the PC payoff and to monitor the current status of the PC contract. The term "sharing formulae" applies also to multiple sets of sharing formulae, such as different sets of parameters for different elapsed time periods; and also to the application of more than three zones, constructed similarly to the three zones shown above. The "sharing formulae" also include restrictions on the returns to investors, such as a maximum or a minimum return.

CF(PC) is the amount payable to the PC investor at settlement. An intrinsic, or "pro-forma," payoff of the PC is computed using the latest available proxy value for $I_t$ in the sharing formulae. This may be reported periodically to investors and homeowners.

HAPNs specify which percentage of the future house price appreciation (as measured by the change in the proxy for the purpose of the PC) is ceded to investors, which is accomplished by selecting the values of the parameters in the above formulas. The parameters are determined by the preferences and needs of the prospective homeowners as well as on the underwriting criteria of the investors, and are mutually agreed upon.

In different embodiments of the invention, restrictions or conditions may be set on the payoff of the PC. These restrictions or conditions may include, but are not limited to, considerations involving the actual change in house price, the number of years for payoffs to be fully effective, and a comparison of the imputed settlement value and the actual final sales price or appraised value. For example, the value of improvements made by the homeowner during the duration of the contract, as estimated by an appraiser, may be deducted from the imputed settlement value based on the proxy, especially when the imputed settlement value is based on an AVM-estimated value that does not appropriately ignore the improvements in its final valuation. In another example, nothing is owed to homeowners if the settlement is within the first three years, say, of the contract, so in this case investors are owed the amount of the HAPN Bond in the event the HPA is negative within the first three years. That is, the HAPN investors would not have to share in any HPA shortfall below the targeted return promised homeowners if settlement were within three years. There may also be limits on payments to the investors within this specified initial period. In another embodiment, the PC payments may be modified depending on whether the settlement proxy value differs by at least a specified amount from the actual sales price. This form may be used to deal with basis risk (i.e., the risk that the computed HPA based on the proxy differs from the actual HPA based on the sales price of the house).

HAPNs are payable upon the sale of the house. In alternative embodiments, HAPNs are prepayable (prior to the sale of the house) upon certain conditions. For example, the minimum prepayment may be the par or nominal value of the HAPN Bond. This prevents homeowners from taking advantage early in the HAPN contract if HPA is initially negative by paying back less than was paid to them by the HAPN investors. Another embodiment prohibits prepayments within an initial "lockout" period, and then prepayments are allowed upon annual anniversaries thereafter. In another embodiment, prepayment is allowed but penalties apply, such as a fee, perhaps after a lockout period.

In Equation (2), the imputed house value at time t is calculated using the sales price, appraised value or an AVM estimate at the initiation of the HAPN contract as its base value (value at time 0), $H_0$. However, in an alternative embodiment, a HAPN issued against currently owned houses may set a previous point in time to start the computation of the HPA. For example, the original purchase price could be used for $H_0$ if the base point in time is reset to when the house was purchased. Such an arrangement then includes already accumulated appreciation and, in alternative embodiments, the value of improvements made to date, as well as future appreciation. Future improvements, however, may be excluded from the final imputed valuation.

In different embodiments of the invention, the base proxy value $I_0$ may be revised after issuance of the PC. For example, the PC contract typically specifies, in order of priority, which proxy will be used for both $I_0$ and $I_S$ in the event the originally specified proxy has been discontinued and the value of $I_S$ is thereby unavailable. Alternatively, they may specify the application of a desk appraisal at settlement. In another example, when the proxy is an HPI, $I_0$ typically changes after its first issuance. The PC may allow the latest value of $I_0$ to replace earlier published values, or it may freeze the value first published.

II. The HAPN Bond

A HAPN Bond is a lien on the house. In a primary embodiment of the invention, the HAPN Bond is a lien on the house with no payments required until settlement. In other words, it is a zero-coupon bond with no amortization payments required. In another embodiment, the HAPN Bond is structured to have interest accrue at a rate called the "accrual rate" and have a "payment rate" set at a potentially different rate than the accrual rate. The accrual rate is the rate used to determine the periodic interest charge of the HAPN Bond, and the payment rate is the periodic rate that determines the amount homeowners pay the investors. If the former is greater than the latter rate, then the debt is negatively amortized, which means the unpaid principal balance (UPB) increases over time.

The HAPN Bond's initial value is established as the amount the PC investors pay to the issuer of the PC at issuance, plus the amount HAPN Bond investors pay for the HAPN Bond (with allowance for such adjustments as expenses or fees). Let A be the amount PC investors would pay for the PC, and let X be the initial amount of the HAPN Bond and f be the discount factor used to convert the future receipt of X to a present value. Then $$X = A + fX \quad (8)$$

or $$X = A/(1-f) \quad (9)$$

The HAPN Bond investors receive the HAPN Bond's UPB at settlement. If the accrual and payment coupons are both zero, and there are no amortization payments, the HAPN Bond's notional value is its initial value. However, in the event that CF(PC) is negative (because, e.g., $I_S < I_0$), the total amount due to the HAPN Bond investors is the UPB of the HAPN Bond less the absolute value of CF(PC). Thus, the HAPN Bond acts as a "performance bond" in the event CF(PC) is negative. The PC investors are not required to pay the issuer any amount upon settlement. If the absolute value of CF(PC) is greater than the UPB of the HAPN Bond, the issuer receives only the amount of the UPB of the HAPN Bond. Issuers of both the PC and the HAPN Bond are the owners of the houses, as evidenced by the proof of ownership. Houses are the collateral for HAPN Bonds and PCs, and the HAPN Bond is used to pay the issuer should CF(PC) be negative, up to the final principal balance of the HAPN Bond.

III. Examples of HAPNs

Example 1

For a House Valued at $100K and Financed Traditionally by 5% Down with a $95K First Mortgage Using the HAPN with the same percentage down, and assuming that a HAPN that shares 90% of the appreciation (that is, when r=0 and D=0.9 in Equation (7)) is valued at $30K, the $30K becomes the initial value of the HAPN Bond, and the first mortgage is now only $65K. Since in the primary embodiment there is no interest or principal payments due on the HAPN Bond, the financing payments are reduced by more than 31% compared to the traditional financing because of lower amortization payments and because a 95% loan-to-value mortgage carries a higher interest rate than a 65% loan-to-value mortgage. This is the affordability benefit of HAPNs.

Suppose at the subsequent sale of the house, the proxy (and the house price) were 10% less, or at $90K. For the traditional financing, homeowner equity would be wiped out and the first mortgage would absorb the rest of the loss, $5K. Actually, this is a potential default situation, depending on what has happened to household income, other expenses and the disposition of the homeowners; and in the event of a foreclosure there would be further costs such as foreclosure costs and abuse by the owners, creating further losses for the mortgagee. With the HAPN, however, the HAPN Bond absorbs 90% of the $10K reduction in house value, or $9K (if there are no restrictions specified in the HAPN contract, e.g., based on an early house sale). The homeowner still has $4K equity and is not as likely to default as with the traditional financing package. The HAPN Bond would absorb 90 percent of the $10K loss in value, and $21K out of the original $30K would be paid to the HAPN Bond investors. The PC investors would not receive or pay anything, as the CF(PC) is now negative. The $65K mortgage would be paid in full and the residual equity of the homeowner is $4K. Obviously, faced with this potential outcome, this would less likely become a default.

On the other hand, suppose at the time of settlement, the proxy rose by 60%, or $60K. With traditional financing, all of the appreciation accrues to the homeowner. However, for the HAPN, the HAPN investor gets 90%, or $54K for the PC plus the $30K HAPN Bond repayment; and the homeowner gets $11K equity. Therefore, the homeowner cedes the potential upside for greater affordability and the sharing of house price decreases.

HAPNs also can be used in workouts. Assume the scenario when a default may occur with the traditional financing when the home price fell to $90K. The lender could write off the $5K loss and take back from the homeowner a HAPN and a new mortgage (whose balance would depend on the current value of the house and how much the HAPN investors paid for the HAPN). For example, when the household has less income, they may need to have lower housing payments in order to be able to stay in the home, so they may agree to cede 90% of future HPA (e.g., worth $30K). Therefore, there is a $60K first mortgage, a $30K HAPN Bond, and no initial equity. Equity increases as soon as the house price increases. Mortgage payments thus fall by about 37%, allowing the household to avoid foreclosure and remain in the house. The valuation of the HAPN depends on many factors, especially the parameters of the sharing formulae above.

Example 2

For a House Worth $300K with a Traditional Financing of a $240K First Mortgage, $45K Second Mortgage, and a Down-Payment of $15K Suppose a HAPN is issued that guarantees the homeowners a 1% annual house price appreciation (i.e., r=0.01, D=1.0, and the time period is annual in Equation (7)). If the HAPN investors are willing to pay $110K, and the down payment remains the same $15K, the initial value of the HAPN Bond is thus $110K and the first mortgage is $175K. (Assume there is no amortization on any of the mortgages, for simplicity.)

Assume the house is sold in 2 years. In one scenario, if the house price and the proxy fall 5% each year, the house is valued at $271K when it is sold. For the traditional financing, the homeowner's equity is wiped out along with $6K of the second mortgage, so this is a potential default situation. With the HAPN, however, homeowner's equity is now $21K, up from the initial $15K due to the promised 1% annual HPA. The HAPN Bond is now worth only $75K, having absorbed the $6K increment in the homeowner's equity promised in the PC contract plus the $29K decline in the value of the proxy. Default is not likely in this scenario.

In another scenario, assume house prices and the proxy increase by 16% in the two years. Under the traditional financing, the homeowner receives all the benefit, for an equity position of $119K. For the HAPN financing, however, the homeowner's equity stays the same as it was after 2 years when the proxy declined: $21K, as promised in the PC contract. In this scenario, the HAPN Bond remains at the original $110, and the PC payoff is $92K.

IV. Payment of HAPNs

Both the HAPN Bond and the PC are claims, or liens, on the real estate. In other words, they both are security instruments that evidence a claim on the real estate, as recognized by the appropriate political jurisdiction. Different lien positions can be applied. For example, possible lien positions could be:

First Lien: the first mortgage (if there is one)
Second Lien: the PC
Third Lien: the HAPN Bond Another configuration is with the PC in first position, the HAPN Bond in second position, and the "standard" mortgage in third. In another embodiment, the HAPN Bond has a higher lien position than the PC. Yet another configuration is with the three liens sharing in foreclosure losses according to pre-specified proportions. Other liens, such as those for home improvement or equity take-out, if allowed by HAPN investors, would likely be subservient to these liens, depending on any restrictions stated in the HAPNs contract.

In a primary embodiment of the invention, the HAPN Bond and the PC are due and payable (and thus settled) upon the sale of the house to an independent third party in an arms-length transaction or whenever the ownership changes. In the latter case, in one embodiment this is allowable only at the option of the PC investors, since the homeowners could use this provision to terminate the HAPN prematurely yet retain at least partial interest in the house. Other conditions as stated in the PC contract also trigger a settlement, but in one embodiment only upon the discretion of either the HAPN Bond or the PC investors (the HAPN Bond contract and the PC could specify agents empowered to make such decisions for the investors.) These include, but are not limited to: if there is a change of ownership, if the first mortgage is retired (i.e., prepaid), if other liens are placed on the house and their total UPB exceeds the limit specified in either the Bond contract or PC, if taxes and insurance payments are not made in a timely manner, if the house is not maintained appropriately, and an annual option at the discretion of the homeowner to prepay (e.g., an annual option of an issuer with a minimum payment of the nominal value of the HAPN Bond, or an annual option of an issuer after a specified period of time). These could be absolute rights of the homeowners or, in another embodiment, conditional upon the approval of the HAPN investors (or their agents). In the embodiments that have these conditions at the discretion of the investors, some of these triggers may be nullified by the HAPN investors in order to preclude the HAPN issuer from terminating the contract inappropriately. In some embodiments, the HAPN includes a final fixed maturity, whereupon settlement procedures that are included in the PC would be invoked.

A common contractual provision is to have limits on other liens so that their total UPB would not cause the net equity position of the owners to fall below a fixed percentage (e.g., 20% or 10%) of the currently appraised value of the house, accounting for the other liens and for the three liens above (namely, the first mortgage, the HAPN Bond and the PC). Homeowners may take out a "fourth" mortgage for home improvements (it is the "fourth" because it may have a lien position behind the mortgage, the PC and the HAPN Bond), as long as their resulting equity position remains within the limits stipulated in the PC or HAPN Bond contract. HAPN investors could approve exceptions to the stated equity limits.

Like most extant lien holders, some specific events may not cause the investors to declare the HAPN Bond and PC due and payable. For example, refinancing the first mortgage into another fixed-rate mortgage but at a lower rate would lower the credit risk for all lien holders, so they may permit this change. But if a fixed-rate mortgage were refinanced into an adjustable-rate mortgage, the default risk to the HAPN Bond and PC investors would increase, and they have the discretion either to call the HAPN Bond and PC due and payable upon such an event or not to allow the replacement financing to precede it in lien priority. In a primary embodiment, the first mortgage is completely separable from the HAPN. This allows the HAPN to be sold separately such as in a secondary market, pooled and securitized. In one embodiment of the invention, the PC may be separated from the HAPN Bond, allowing it to be traded separately from the HAPN Bond, such as in separate pooled securities. The HAPN Bond, however, would still be the performance bond should the PC have a negative valuation at settlement.

HAPN contracts may include procedures to resolve disputes both during its duration and upon settlement. These may include completing new appraisals, arbitration, and judicial proceedings. Third parties, typically for a fee and/or premiums, may provide guarantees to homeowners and/or investors for the payoffs of the PC and/or the HAPN Bond.

In embodiments of the HAPN, the actual sales transactions cost paid by the homeowner may be deducted from the amount due the HAPN investor; or a set percentage, such as 3%, may be deducted to reflect expected sales expenses. These may apply when settlement involves the sale of the house.

As in most mortgage contracts, fraud or misrepresentation may be a problem. Terms may be inserted into the PC that provide relief from these problems, such as calling the HAPN due and payable, with stated penalties.

V. Advantages and Basic Risk of HAPNs

HAPNs substantially increase housing affordability for homeowners and have positive expected returns for investors. Homeownership affordability is enhanced because the price of the HAPN is paid to the homeowner for use in purchasing the house (or to monetize past and/or future house price appreciation), so the down payment coming from homeowners' funds is reduced; or for any given down payment, a larger house can be purchased. The price of the PC is determined in the marketplace and deducted for various costs, which may cause the balance of the HAPN Bond to be different from the amount the investors pay for the HAPN (i.e., pay for both the PC and the right to be paid the balance of the HAPN Bond at settlement). In a primary embodiment of the invention, an interest rate, called the accrual rate, is not charged on the HAPN Bond. Hence, the HAPN Bond is then a zero-coupon bond that is payable to the HAPN Bond investors upon settlement. Homeowners' monthly payments are thus lower than if, without the HAPN, an ordinary mortgage has required monthly payments with interest accruing and payable and amortization payable. If, as in one configuration, a mortgage is in first-lien position, it is possible that it carries a lower interest rate than it otherwise would without the HAPN, because of the credit-risk protection afforded by the lower-lien-priority HAPN, further reducing the monthly payments. To summarize, the invention enhances home affordability by reducing both the down payment and monthly payments.

Because HAPN investors share in declining house prices, homeowner default risk is reduced dramatically, as shown in the above examples. This benefits the homeowner and the lender of the first mortgage, and has the salient effect on the housing market by limiting the number of foreclosed houses that tend to depress further any house price declines. This benefits homeowners and lenders in general, not just the homeowners with HAPNs.

In contrast to SAMs, which are a combined mixture of traditional mortgages and sales of house price appreciation, HAPNs are a separate instrument reflecting only the interest in the appreciation. In its primary embodiment, the maturity is indefinite, depending on the sale of the house and is not prepayable, as are traditional home mortgages. The valuation of the HAPN, then, is completely different from the complex valuation of a mortgage, where prepayments depend critically on market interest rates. This makes the HAPN instrument unique and more appealing to capital market investors.

HAPNs gauge the investors' returns using a proxy, which are not altered to any significant degree by house improvements. Therefore, homeowners have the proper incentive to maintain and improve their property and thus avoid the moral hazards that have plagued SAMs.

The HAPN also is an attractive alternative to Reverse Mortgages. Assume seniors own their house outright and want to cash out some equity. A HAPN could be arranged that would use the initial purchase price of the house as the initial proxy value ($I_0$), so a given percentage of HPA—such as 100% ($D_C=1.0$) in this instance-based on an AVM, e.g., would be used to compute the HPA to date and the future HPA. The combined value of the HAPN would be based on any total appreciation from the initial house price. The homeowner would have no out-of-pocket financing payments (except, e.g., fees and points), since the HAPN Bond in this example carries a zero coupon and has no amortization.

However, the HAPN is subject to "basis risk," which is the difference between the proportional change in the proxy (e.g., an AVM estimate) and the proportional change in the house price. For example, the PC based on the proxy may indicate that the homeowner owes the investor $10,000, but the actual house price did not change. This creates a burden on the homeowner. Different methods may be applied to deal with this risk. For example, third-party insurers or guarantors may be used by homeowners or investors to help protect their interests, i.e., by insuring against basis risk. The basis risk of using an AVM is materially smaller than using an HPI, and the basis risk of a desk review may be lower than that of an AVM. As mentioned above, basis risk may be addressed in an alternative embodiment that compares the actual sales price to the imputed settlement value, and makes an adjustment if the difference is large (as specified in the PC).

VI. Unique Features of HAPN

A HAPN is a lien on real estate whereby the homeowners cede a specified sharing of future house price appreciation for a lower interest rate. In its primary embodiment, the features that make HAPNs unique and advantageous are:

Calculation of the house price appreciation is by a proxy, primarily a Desk Valuation. The final Desk Valuation may use the house's characteristics that were used for the initial valuation, where the change in these valuations is the house price appreciation. Therefore, (1) It reduces moral hazards compared to when the house price appreciation is calculated using the actual house price or a standard appraisal.
(2) The basis risk of a HAPN is small, especially when using a Desk Valuation.

HAPNs use unique sharing formulae. This allows the HAPN issuers the flexibility to sell various forms and amounts of house price appreciation.

Zero-Coupon Bond.
(1) The HAPN Bond is a lien on the property of the amount the HAPN investor pays the homeowner for the HAPN. By not accruing or paying interest on the HAPN Bond, housing affordability is enhanced. At least a portion of the house financing, then, does not require interest and amortization payments; so for a given household income, a larger house is affordable and renters may be qualified to own for the first time.
(2) Homeowners under financial stress, such as reduced income, higher mortgage payments, and/or a lowered house value, may use the HAPN as a vital part of a financial restructuring of their housing debt, so as to avoid foreclosure. These types of restructuring are called "workouts."
(3) HAPNs are an affordable and attractive alternative for Reverse Mortgages for home-owning seniors.

No amortization is required on the HAPN Bond, and the affordability advantages are thereby enhanced.

Indefinite Maturity. The HAPN matures upon sale of the property. This avoids having homeowners to come up with the cash to settle the HAPN prior to the sale of the house. This also provides investors with a longer-lived instrument than traditional mortgages, and an instrument that is not very sensitive to interest rate levels. In alternative embodiments, finite maturities are applied.

The Participation Contract (PC) is not prepayable. The PC is the component of HAPNs that defines a lien in the amount of a specified percentage of the change in the final and initial Desk Valuations (or between the final Desk Valuation and the initial purchase price). This feature is important to capital market investors, and they will pay more for the HAPN because of this feature, to the benefit of homeowner affordability. Also, pre-house-sale prepayments cause complications that are typically addressed by special settlement procedures, which are avoided here. Alternative embodiments allow prepayments, but potentially with penalty fees and/or restrictions.

The HAPN is a separable financial instrument. It is separate from a standard mortgage, if there is one. Given the above, the HAPN does not prepay or have a return like a standard mortgage, which makes it attractive to capital market investors as a "pure" investment in HPA. By splitting off the HAPN, the standard mortgage is the same as it is today, so there are specialized outlets for it, and the HAPN will have equity-type investors. In alternative embodiments, the HAPN is combined with a traditional mortgage, e.g., to take advantage of the first-lien position.

Other liens are allowed and are expected. The HAPN is expected to have a standard mortgage (or even home improvement loans) in superior lien position. Also, within specified limits, homeowners retain the flexibility they have today to restructure their house financing and to add to it. The limits typically include total loan-to-value limits.

HAPN investors share in negative HPA. The HAPN Bond is a performance bond for any amounts owed the PC issuers at settlement. Since the HAPN investor shares in down markets, homeowner equity is not eroded as much as with standard mortgages, thereby maintaining positive homeowner equity for even very large decreases in market values. Thus, homeowners with HAPNs are more likely to avoid defaulting in such a market. Lenders of first mortgages with HAPNs also thereby benefit, as there will be fewer foreclosures. And mortgage lenders and guarantors in general benefit as there are fewer foreclosures to depress further a declining housing market.

The HAPN can take alternative lien positions, even if there is a traditional mortgage on the house.

VII. Systems for Implementing HAPN

Reference will now be made in detail to exemplary embodiments of systems and methods consistent with the present invention, which is also illustrated in the accompanying drawings. Those of ordinary skill in the relevant art will recognize from the description that other embodiments are possible, and changes may be made to the implementations described herein without departing from the spirit and scope of the invention.

The use of computers is essential for successful applications of HAPNs. Automated worksheets are required to show potential customers and investors simulations of possible outcomes with a HAPN and without a HAPN, to aid in their understanding of HAPNs and to allow them to select their preferred form of the HAPN, which means selecting among possible alternatives based on different actual results regarding appreciation. It is very difficult to do this without using computing power, especially if HAPN training courses use interactive scenarios, where the trainee suggests various different scenarios to look at. The software needs to be specifically designed for potential borrowers or investors to be able to pick the specifications and generate financial outcomes, with highly controlled places that allow inputs by the end users. Different programs are required for training and for contract design purposes as they require different levels of flexibility and complexity. The typical loan agents are not qualified or reliable enough to provide calculations at this level of complexity and importance. These programs are most likely to be written in the computer languages such as Java or C#, loaded on the server, and accessible through intranet or Internet by loan agents with secure password control. It is difficult to envision how this could be done without the use of computers and computer systems.

To be successful, HAPNs need to be mass marketed and securitized. After enough HAPNs are issued that have similar parameters, they can be mass-marketed and, with a critical mass being produced, a secondary market involving pooling and securitization becomes essential. In this environment, computerization is absolutely essential, in order to control the origination process, to provide uniform servicing and reporting throughout the term of the HAPNs, and to settle the HAPNs appropriately, accurately and securely. Each of these is now discussed.

The origination process will require uniform documents, which are made more secure by being controlled centrally via a computer distribution system. Also, customer training is essential to ensure complete and uniform understanding and to avoid predatory lending practices. Essential training materials need to be controlled centrally and distributed securely to the appropriate customer training organizations. Inputting the various documents and HAPN parameters into a secure computer storage device is essential to assure both borrowers and investors that the correct contract parameters have been immortalized and represent the agreed-upon parameters. This is especially critical in the event there is more than one "standard" HAPN that becomes popular.

Servicing the HAPNs involves creating periodic reports on the status of each HAPN and summarizing these reports for pools of HAPNs that are securitized. Speed in reporting monthly or quarterly, and the accuracy of the reporting require computer-based systems and methods. (See below for exemplary steps in this process.) Pro forma valuations, for example, may require that for each property an AVM be accessed to update the current value of the property, and describe to borrowers and investors the value of the HAPN components if the HAPNs were settled on a specific date. To do this quickly and accurately, computing power is absolutely essential.

Finally, the settlement of HAPNs needs to be done accurately and expeditiously, and a computer-based system is essential when there are many HAPNs to keep track of. For example, the original appraisal that was stored electronically may have to be sent to an appraiser who is with a different appraisal firm than the one that conducted the original appraisal, for the purpose of conducting a Desk Appraisal or an AVM that uses the attributes of the house and property that were described in the original appraisal. To have this process conducted speedily and accurately requires electronic processing and communication.

Today, it is impossible to envision how the mortgage market could function without computing power. Computers are used at each phase of origination, servicing and settlement, and involve pooling and securitization. Even without pooling and securitization, computers are deemed essential to perform these functions. HAPNs is another type of mortgage, and it is more complicated than the traditional mortgage, so its need for computing power is even greater than for traditional mortgages to minimize the possibility of errors by human processing.

Security is another reason the use of computers is essential. With secure computer systems, the information on each HAPN is kept confidential and secure, so that tampering by anyone to change the HAPN terms is avoided. This ensures accurate reporting (as well as timely) to homeowners and investors, and secure and accurate settlement at the conclusion of the contract. Both homeowners and investors would be harmed without the assurance of this accuracy and security provided by the computers. Systems that did not use computers are not capable of providing these assurances, and they are not perceived as being capable, so the success of the HAPNs program requires the use of computer systems.

The computer and computer system for HAPN are electronic devices with necessary computing power to implement the methods of issuing, servicing and reporting HAPN. They include general-purpose computers (e.g., a server or a personal computer) executing instructions of issuing, servicing or reporting HAPNs, dedicated electronic devices built specifically for realizing the methods (e.g., special purpose computers, field-programmable gate arrays and application-specific integrated circuits), or combination of general-purpose computers and dedicated electronic devices.

In one embodiment of the invention, a HAPN system includes four components. As shown in FIG. 1, the components include a database management system 110, a monitoring component 120, a reporting component 130, and a HAPNs payment component 140. In one embodiment of the invention, steps are embodied in machine-executable software instructions, and components of the present invention are carried out in a processing system by a processor executing the instructions. In other embodiments of the invention, hardwired circuitry may be used in place of, or in combination with, software instructions to implement the present invention.

A database management system 110 holds identifying information, including the initial parameters and terms of the PC and the HAPN Bond, the homeowner-specific data including identification and other application data that is useful for underwriting. Investor and banker/broker identification is also included. The data needs to be sufficient to price the PC and produce the necessary documents. Database 110 has the ability to accept either manual or electronic input and to deliver either printed or electronic output.

In one embodiment of the invention, database 110 uses a query language (e.g., "SQL") to access stored information. The query language allows the user to extract data either using a keyboard or using another program without knowing the detailed structure of the database. For example, the user might be able to request, using a query language, the initial HAPN Bond sizes for all HAPN Bonds in a specific pool of PCs/HAPN Bonds without knowing precisely where this information is located in database 110. In addition, database 110 includes methods of checking for possible data input errors and/or data inconsistencies and for reporting and correcting those errors and inconsistencies.

In one embodiment of the invention, the initial attributes of the house are saved in the database 110. These initial attributes are used in the final valuation and in interim periodic reports, as if the house had not been improved. In an alternate embodiment, the attributes are allowed to be different in the initial and final calculations of the proxy valuation. Also, alternative embodiments allow the proxy (e.g., an AVM) itself to be different when applied to produce the initial and final valuation estimates, or be frozen wherein the initial model is preserved in the database 110 and is applied in the final valuation.

A monitoring component 120 queries and takes input from agents that monitor the ongoing status or performance of each element in the HAPNs, with particular emphasis on obtaining updated proxy values and status changes that constitute triggering events of the payment function. As appropriate, new information is uploaded to the database.

A reporting component 130 allows ad hoc or standard queries to database 110 and generates electronic or printed reports. In the case of a HAPN or pool of HAPNs, this component queries database 110 and reports on current status, with updates on proxy values, Desk Valuation estimates, and on any other attribute either for individual HAPNs or for the aggregate.

A certificate payment component 140 stores the definition for events that trigger payments to HAPN holders, identifies when triggering events occur, calculates any payments due, and issues instructions to pay HAPN holders (or homeowners out of the HAPN Bond, in case the change in the proxy is negative).

Figure 2:
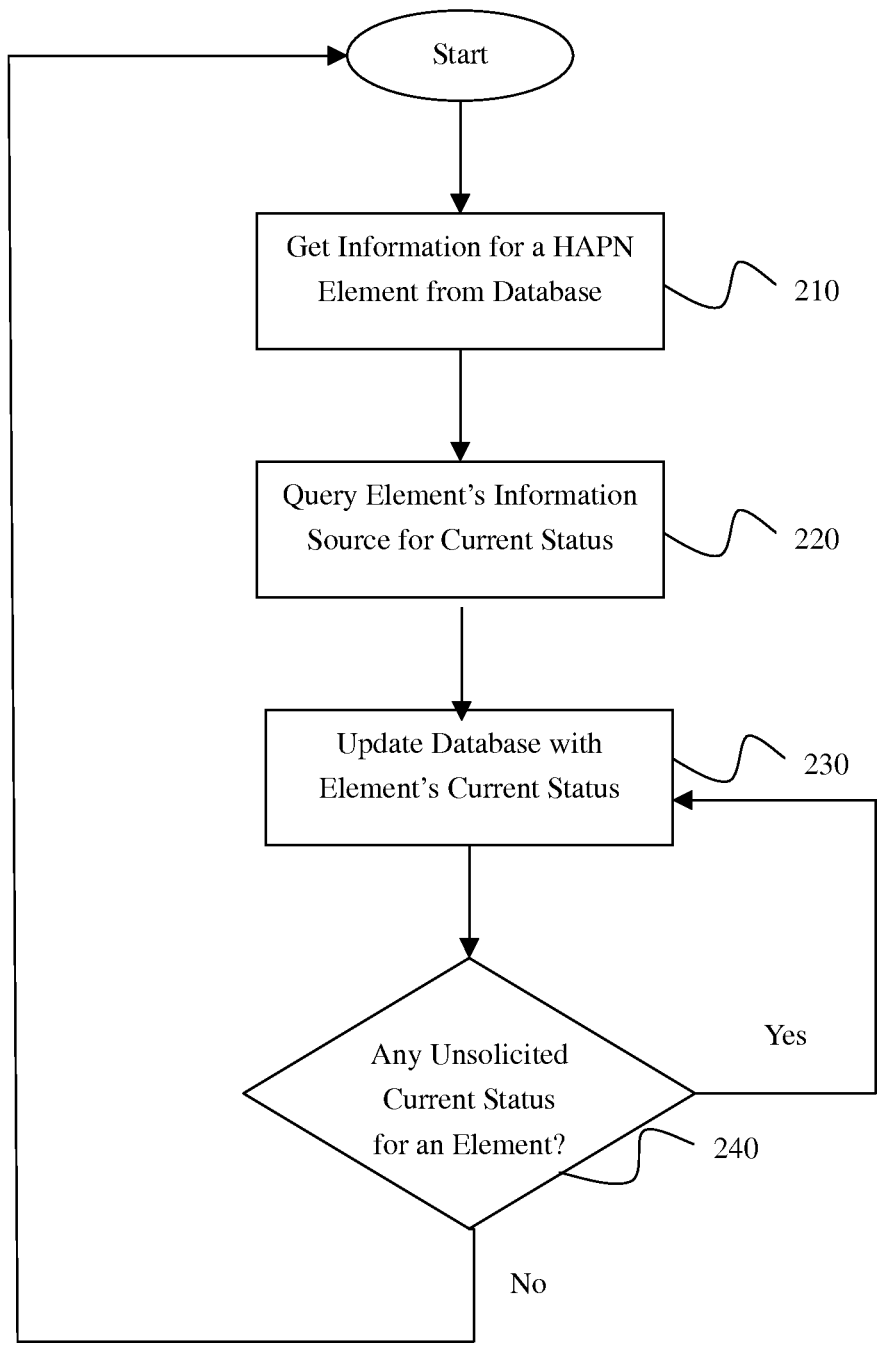
FIG. 2 is an exemplary flowchart of the steps performed by the monitoring component of a HAPN system.

The monitoring component 120 tracks the status of the intrinsic value of the PC, which is the amount due the investors if final settlement was required upon the reporting date. It also tracks various data pertinent to homeowners and investors. FIG. 2 is an exemplary flowchart of the steps performed by a monitoring component of a HAPN system.

As shown in FIG. 2, the first step of the process gets information concerning a HAPN element from database 110 (step 210). The information includes the identity of a status information source for the element. The status information source is anything that can supply current status regarding the element, such as person, a computer system, or a database. The status information sources are typically the source of updates for the proxy updates, Desk Valuation estimates, public record data suppliers (such as monitoring changes in liens on the house), and homeowner-supplied notifications about pending changes in ownership or lien status.

Next, monitoring component 120 queries the HAPNs element's information source(s) for the current status of the element (step 220). In the case of a human information source, querying typically involves generating a written message requesting information, such as a letter or email message. In the case of an automated information source, querying typically involves an electronic service request sent across a network, or an electronic query to the database.

When an element's current status information is received in response to the query, monitoring component 120 records the information in database 110 (step 230). For a non-electronic response, such as a letter from a person, recording the current status information in database 110 typically involves manually entering the information using an input device. For an automated response, such as the electronic results of a query to a remote database, recording typically involves automatically saving the information in database 110.

In step 240, if current status information for a HAPN element arrives unsolicited (i.e., not in response to a monitoring component query such as a required notification from homeowners of impending changes in ownership or lien status), the monitoring component 120 updates database 110 with the current status (step 230). If there is no unsolicited current status information to process, the monitoring component process returns to step 210 to process another HAPN element.

Figure 3:
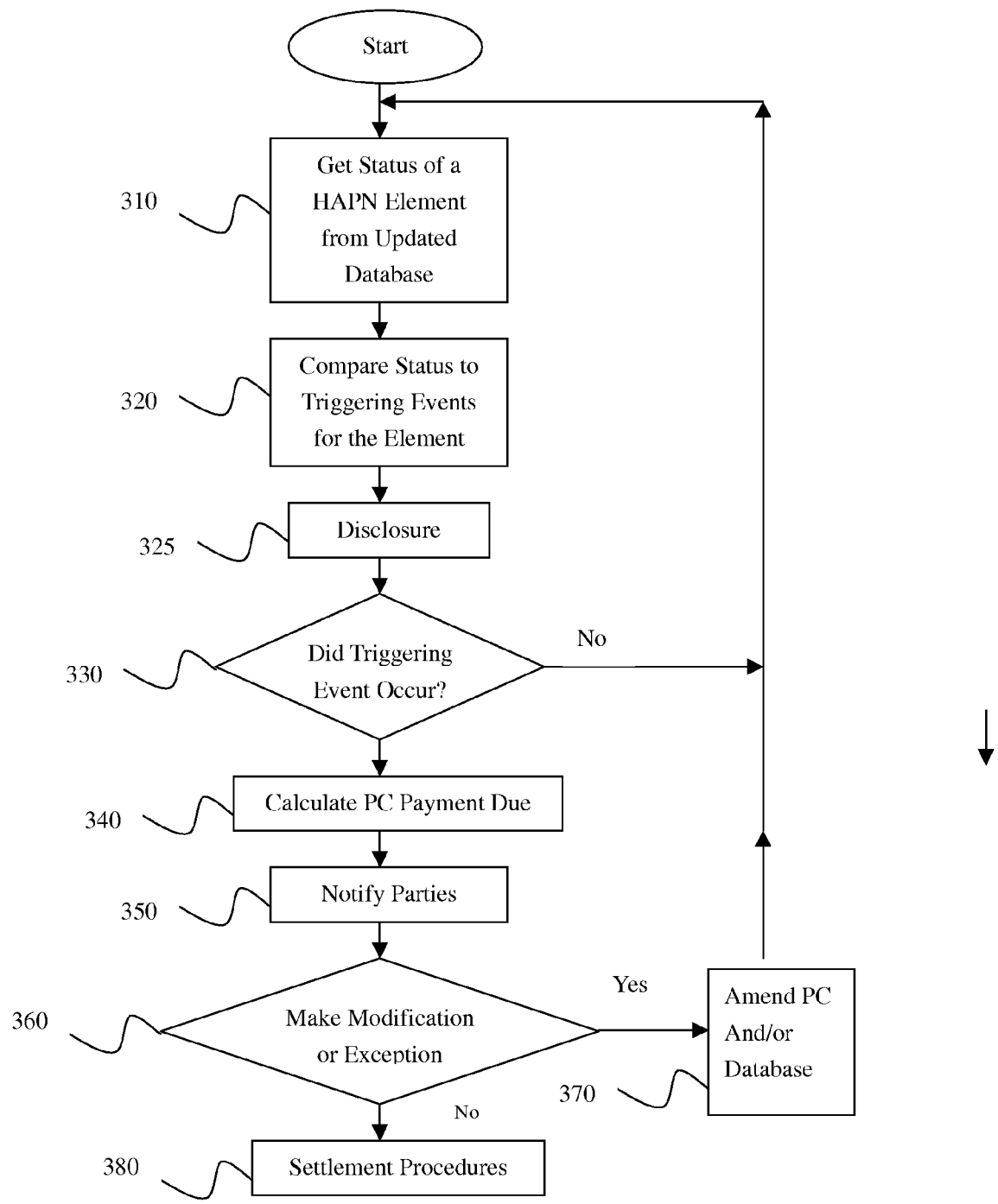
FIG. 3 is a flowchart of the steps performed by the final payment component of a HAPN system.

FIG. 3 illustrates a flowchart of the steps performed by the HAPNs payment component of a HAPN system in one embodiment of the invention. The first step of the process gets the status information of a HAPN element from database 110 (step 310). Next, payment component 140 compares the status information to the triggering event or events for the HAPN element (step 320). Payment component 140 keeps a definition of each triggering event for a HAPN, such as a change in home ownership or lien status, the refinancing of existing mortgages, or another event monitored or recorded by the system. If the triggering event did not occur (step 330), then payment component 140 returns to step 310 to process another HAPN element. If the triggering event occurred (step 330), then the process moves to step 340.

In step 340, payment component 140 calculates the PC payment due upon the triggering event. The calculation can involve any mathematical formula related or unrelated to any variable measured by the system. For example, the payment can be based on the change in the proxy, or it could be modified by contractual terms recorded in the database 110, which may modify the payment due based on, e.g., the corresponding house price change. Next, payment component 140 issues instructions to notify the various parties that a trigger has been tripped and, unless overridden by the holders/investors, the payment is due (step 350). This typically involves sending an electronic or printed notice to the paying agent for the HAPN in question. Interaction among homeowners and investors may determine whether an exception and/or a PC modification is allowed (steps 360 and 370); otherwise, settlement procedures are applied (step 380). An example of an allowed exemption is when the homeowner refinances the mortgages into a low-rate similar mortgage.

One of ordinary skill in the art will recognize that many modifications can be made to the components and steps described without departing from the principles of the present invention. For example, monitoring component 120 and reporting component 130 could be combined into a single component that performs the functions of both.

Figure 4:
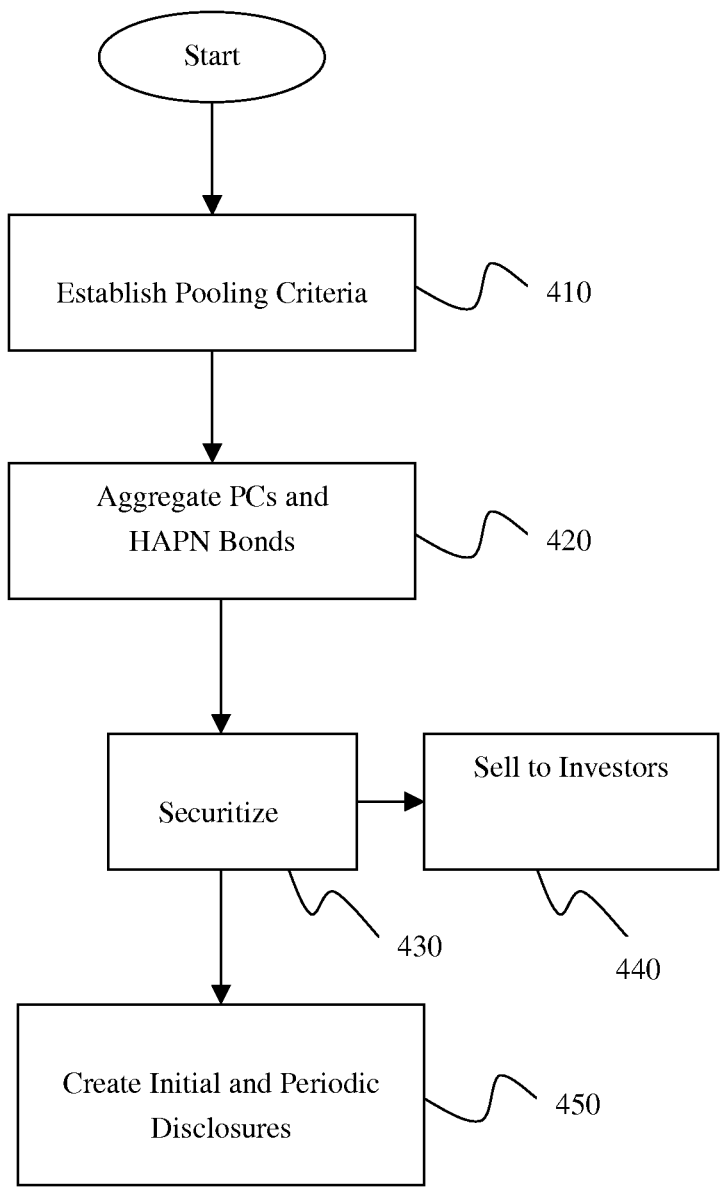
FIG. 4 is a flowchart of steps for issuing pooled HAPNs.

HAPN investors can sell their HAPNS either individually or in pools, which may be securitized and sold to a broad base of investors. FIG. 4 is an exemplary flowchart of the steps for securitizing HAPNs.

Pooling criteria that determine which HAPNs are aggregated in specific pools are established in step 410. For example, a pool may consist of HAPNs that use the same proxy. Other criteria, for example, may aggregate these "subpools" and disclose to investors the percentage using the various base values of the proxy. Step 420 is the aggregation of HAPNs into pools, according to the criteria established in Step 410. The pools are sold to investors through a securitization process (step 430 and step 440). The database 110, as updated in FIG. 2, is queried to produce the initial and periodic disclosures (step 450).

The purpose of the securitization process is to broaden the investor base for HAPNs, hence broaden the demand for them and increase the initial price to be received by homeowners for issuing the HAPNs. Further, the greater liquidity affected by the securitization provides price information useful to account for real-time valuations of the HAPN investments, increasing the investor support of this product.

Figure 5:
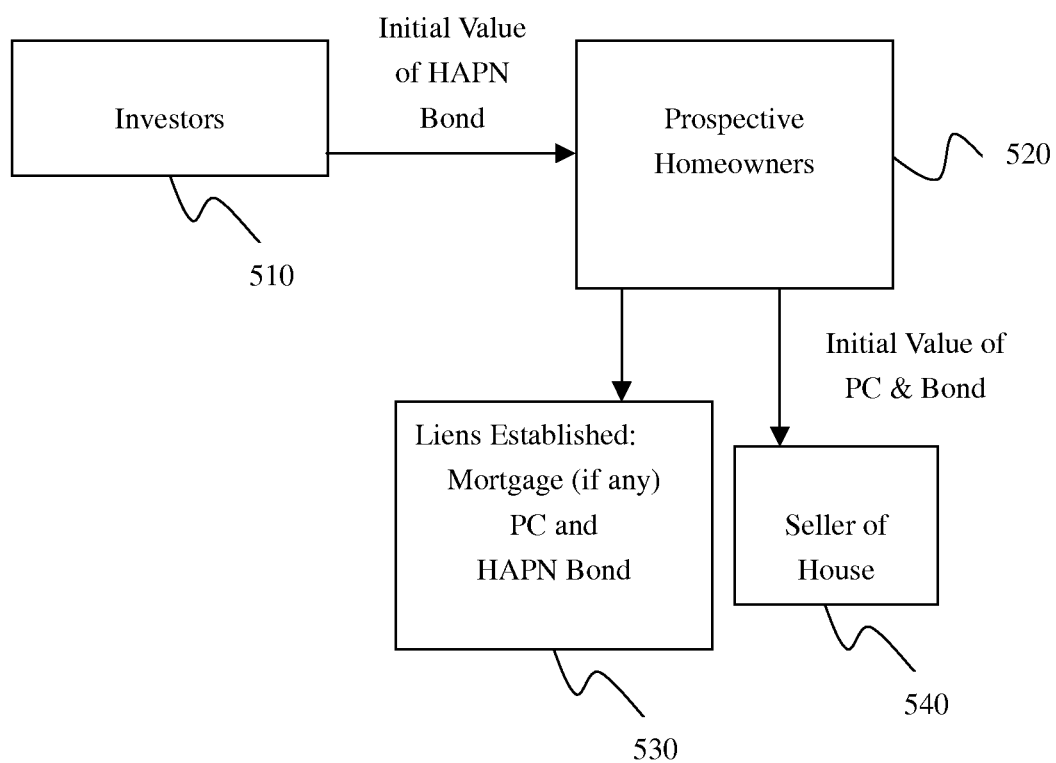
FIG. 5 is a block diagram illustrating the process of the initial cash as the basis to issue HAPNs.

FIG. 5 describes the cash flows upon the initiation of the HAPN contracts in one embodiment of the invention.

Investors (step 510) pay prospective homeowners for the right to receive a share of future house price appreciation, as determined by the change in the specific proxy and the specific parameters of the sharing formulae, as modified by specified restrictions on the payoffs. The amount paid is established as the size of the HAPN Bond, which in one embodiment of the invention is a zero-coupon HAPN Bond. Upon settlement, the investors are due the amount of the HAPN Bond, less any amount owned the homeowner if the PC formula results in such payments (e.g., when the proxy has fallen since inception of the contract). The HAPN components are established as liens against the real estate (step 530). The order of the liens varies according to the selected embodiment. In some embodiments there may not be a standard mortgage; e.g., when seniors wish to monetize accumulated and future equity increases in their homes. The seller of the house, in one embodiment of the invention, receives the amount paid by the investors for the PC/HAPN Bond combination (i.e., the HAPN), in step 540. That is, the HAPN Bond becomes part of the financial structure for the house purchase, substantially increasing the affordability of the house.

Figure 6:
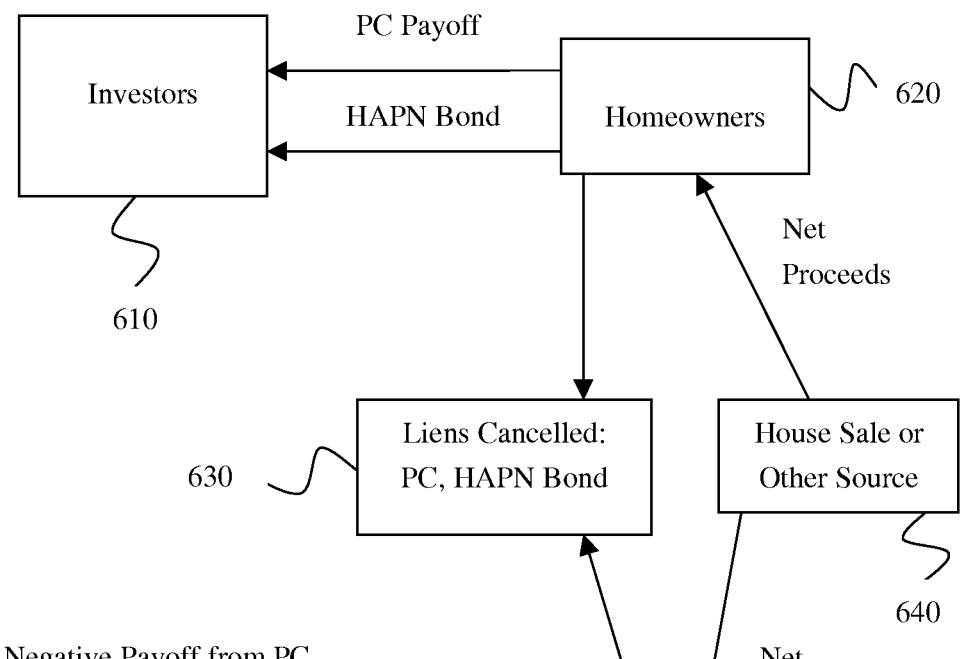
FIG. 6 is a block diagram illustrating the payment process associated with the final settlement of HAPNs.
Figure 6:
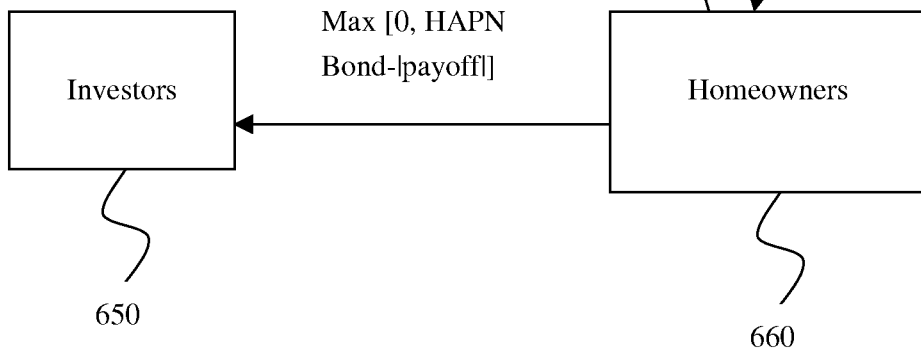

FIG. 6 describes the cash flows upon final settlement of the HAPN in one embodiment of the invention. FIG. 6 describes the two situations that may occur: non-negative payoff to the PC investors and a negative payoff to the PC investors (i.e., a return to the homeowner). At settlement, investors are not liable for any cash payments to homeowners; rather, any amounts due homeowners because of the negative settlement cash flows of the PC are deducted from the repayment of the HAPN Bond balance due investors. The investor's liability is thus limited to the amount of the HAPN Bond.

The house sale is the primary trigger of the settlement of the HAPN (step 640). Other triggers include other types of ownership changes and default on the terms of the contract, at the discretion of the investors. At the settlement, the PC and the HAPN Bond liens are satisfied and hence cancelled (step 630).

If the payoff is non-negative (i.e., the proxy and formula determines that homeowners owed the PC investors, or owe to them zero), the PC lien will reflect this fact (step 630). Homeowners (step 620), from the proceeds of their home sale (step 640), are required to pay off the PC lien (with the PC payoff) and the HAPN Bond lien (with the HAPN Bond repayment) to the investors (step 610), thereby satisfying and cancelling the liens (step 630). In some instances, the amount owed investors may exceed the net proceeds of the sale of the house. Depending on contractual provisions, the homeowner may be liable for this excess due investors.

If the payoff is negative (i.e., the proxy and formula determine that homeowners (step 660) get paid from the PC, out of the HAPN Bond amount), investors (step 650) receive the HAPN Bond amount less the absolute value of the PC payoff. If the amount due the homeowners (step 660) is greater than or equal to the amount of the HAPN Bond, then the payment to HAPN investors is zero and no further payment is required from the PC investors. That is, the investors' liability is limited to the size of the HAPN Bond. Upon settlement, the liens are cancelled (step 630).

One skilled in the art will recognize that the amounts of the cash flows and the types of the triggering events can be varied without departing from the principles of the present invention. For example, instead of the sale of the house, the cash flows to the PC holders could be triggered by a mortgage payment delinquency event, such as a 180-day payment delinquency, or a foreclosure event, at the discretion of the HAPN investors (so as to avoid moral hazards wherein the homeowner triggers HAPN settlement by being deliberately delinquent on the mortgage payments). In another example, the cash flows could be triggered by the refinancing of the mortgage, but the investors could agree not to call the PC and HAPN Bond due and payable. Also, the cash flows could be triggered by a prepayment, according to the prepayment provisions specified in the PC.

Figure 7:
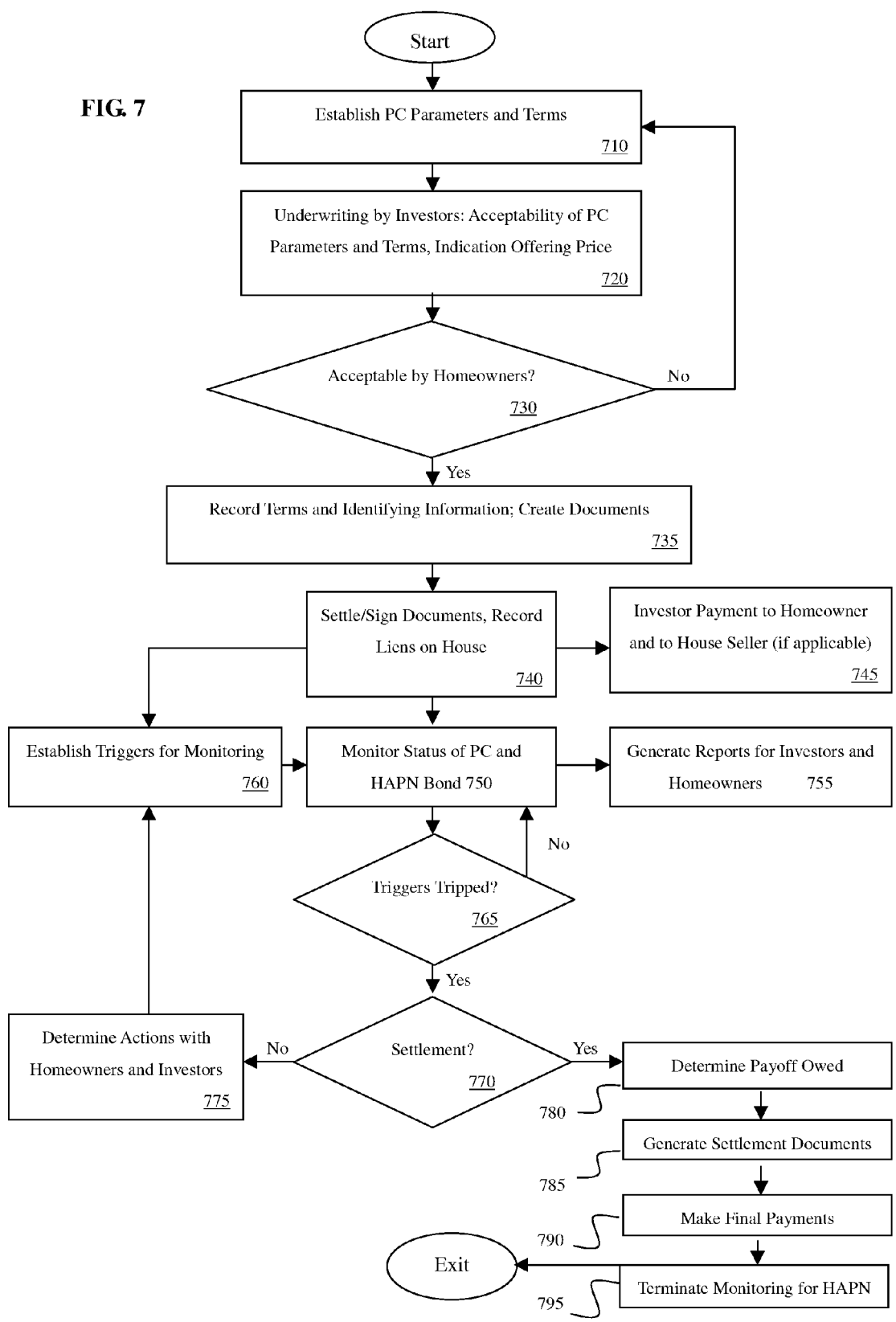
FIG. 7 is an exemplary flowchart of a method for using HAPNs.

FIG. 7 is a block diagram illustrating the process associated with an issuance of de novo PCs and HAPN Bonds for issuance, monitoring and settlement in accordance with the principles of the present invention.

The first step is to populate the database 110 by establishing the PC parameters and the terms (step 710), which include but are not limited to the proxy or proxies used to compute changes in the housing market, the specific values of the parameters of the sharing formulae, modification that may be super-imposed on the formulaic application, and the conditions or triggers that determine the maturity of the PC and HAPN Bond (or a fixed maximum maturity in one embodiment of the invention).

Investors (or their agents) need to underwrite the purpose of HAPN (step 720). PC and HAPN Bond investors face the risk of non-fulfillment of the contract due to issuer default, typically triggered by defaulting on the mortgage. Information relevant to the underwriting is reviewed, including the credit scores of the issuers (e.g., the FICO scores), as is the acceptability of the HAPN terms; if not acceptable, a denial or a counteroffer with different terms is issued. An indication offer price is also generated.

If the terms are acceptable to both the homeowners (step 730) and the investors (step 720), the terms and identifying information are recorded in the database 110 and the appropriate documents are created (step 735) that include the liens and evidence of the obligations due. The parties settle the agreement by signing the documents and recording the liens on the house (step 740), in the priority order agreed upon with the standard mortgage issuer.

Investors make the agreed-upon payment to the homeowner and the homeowner in turn uses these funds to purchase the house (step 745, as described in FIG. 5).

The monitoring (step 120) and reporting (step 130) phases are now begun (steps 750 and 755).

From the PC contract terms, the triggers are established and used for monitoring the status of the PC and HAPN Bond (step 760).

In each data update cycle (in one embodiment of the invention, one month), the system queries whether any of the triggers are tripped (step 765). If any of them are tripped, the parties are notified (step 130).

The investors, after perhaps consulting with the homeowners, determine whether the HAPN is due and payable, and if not, consult with the homeowners to determine whether any changes are necessary to the PC contract (which requires the agreement of the homeowners) (step 775). If so, the triggers may be re-established (step 760). If not, then monitoring is continued as before (step 750).

If settlement is called for by the investors, the payoff owed is calculated (steps 780 and 140), and settlement documents are generated by the system (step 785).

Final payments and lien cancellations are made to conclude the HAPN (steps 790, 140, and FIG. 6).

Finally, a system may determine whether the end of the term for monitoring the performance of the HAPN is reached (step 795). If the HAPN is part of a pool of HAPNs (as described in FIG. 4), the HAPN is removed after passing through the appropriate cash flows (if any).

The present invention may be implemented by computers or workstations organized in distributed processing system architecture, with any suitable combination of software, hardware, and/or firmware.

Figure 8:
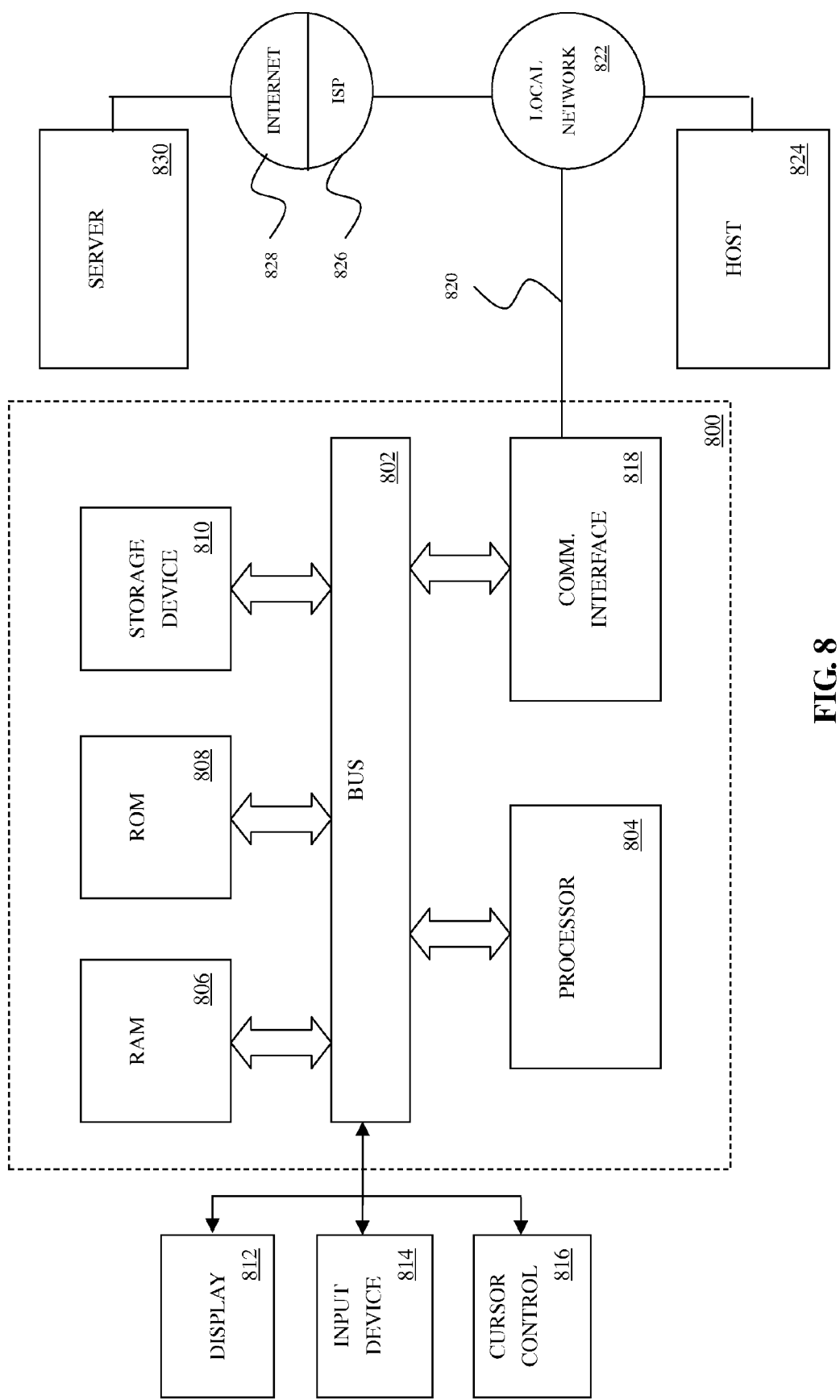
FIG. 8 is a schematic block diagram of a data processing system architecture suitable for use with the present invention.

FIG. 8 is a block diagram that illustrates a data processing system 800 in which methods and systems consistent with the present invention may be implemented. System 800 includes a bus 802 or other communication mechanism for communicating information, and a processor 804 coupled with bus 802 for processing information. System 800 also includes a main memory, such as a random access memory (RAM) 806 or other dynamic storage device, coupled to bus 802 for storing information and instructions to be executed by processor 804. RAM 806 also may be used for storing temporary variables or other intermediate information during execution of instructions by processor 804. System 800 further includes a read-only memory (ROM) 808 or other static storage device coupled to bus 802 for storing static information and instructions for processor 804. A storage device 810, such as a magnetic disk or optical disk, is provided and coupled to bus 802 for storing information and instructions.

System 800 may be coupled via bus 802 to a display 812, such as a cathode ray tube, for displaying information to a user. An input device 814, including alphanumeric and other keys, is coupled to bus 802 for communicating information and command selections to processor 804. Another type of user input device is a cursor control 816, such as a mouse, a trackball or cursor direction keys, for communicating direction information and command selections to processor 804 and for controlling cursor movement to display 812. This input device typically has two degree of freedom in two axes, a first axis (e.g., x) and a second (e.g., y), that allow the device to specify positions in a plane.

The present invention is related to the use of system 800 for issuing and maintaining HAPNs. The operations may involve accessing information from remote platforms and transmitting information to remote platforms. According to one implementation of the invention, information from remote platforms is provided to system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of radio frequency, acoustic or light waves, such as those generated during radio wave and infrared data communications. For example, the initial attributes of a house can be pre-stored in a read-only memory or a static storage device, and are loaded into a dynamic memory when a proxy for Desk Valuation is calculated. A CPU accesses the dynamic memory to fetch the initial attributes for calculating the proxy. Similarly, current attributes of a house can be pre-stored in a read-only memory or a static storage device, and loaded into a memory of a computer, and a CPU uses the current attributes to calculates the prior base value and the settlement value. Different sharing formulae can be stored in a read-only memory of a computer or a static storage device, and a CPU can access the sharing formulae loaded in dynamic memory to fetch the sharing formulae when calculating the cash flows of the PC, or PC payments upon settlement.

Common forms of computer-readable media include, for example, a floppy disk, a flexible disk, a hard disk, a magnetic tape, any other magnetic medium, a CD-ROM, any other optical medium, a punch card, a paper tape, any other physical medium with patterns of holes, a RAM, a PROM, an EPROM, a FLASH-EPROM, any other memory chip or cartridge, a carrier wave as described hereinafter, or any other medium from which a computer processor can read.

Various forms of computer-readable media may be involved in carrying one or more sequences of one or more instructions and/or data to processor 804. For example, instructions may initially be carried on the magnetic disk of a remote computer. The remote computer can load the instructions into its dynamic memory and send the instructions over the telephone line using a modem. A communication interface 818 local to computer system 800 can receive the data on the telephone line and use an infrared transmitter to convert the data to infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

As shown, system 800 includes communication interface 818 coupled to bus 802. Communication interface 818 provides a two-way data communication coupling to a network link 820 that is connected to a local network 822. For example, communication interface 818 may be an integrated services digital network (ISDN) card, or a modem to provide a data communication connecting to a corresponding type of cable or telephone line, or an infrared-transmitting modem directly connected to local network 820 and connected via an infrared detector to bus 802, as discussed above. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry analog or digital data streams representing various types of information.

Network link 820 typically provides data communication through one or more networks to other data devices. For example, network link 820 may provide a connection through local network 822 to a host computer 824 and/or to data equipment operated by an internet service provider (ISP) 826. ISP 826 in turn provides data communication services through the internet 828. Local network 822 and internet 828 both use electric, electromagnetic or optical signals that carry digital data streams. The signals through the various networks and the signals on network link 820 and through communication interface 818, which carry the digital data to and from system 800, are exemplary forms of carrier waves transporting the information.

System 800 can send messages and receive data, including program code, through the network(s), network link 820 and communication interface 818. In the internet example, a server 830 might transmit a requested code for an application program through internet 828, ISP 826, local network 822, network link 820, and communication interface 818. In accordance with the present invention, one such download application provides a bridge between two remote information sources, as described herein. The received code may be executed by processor 804 as it is received, and/or stored in storage device 810, or other non-volatile storage for later execution. In this manner, system 800 may obtain application code in the form of a carrier wave.

Although system 800 is shown in FIG. 8 as being connected to one server, 830, those skilled in the art will recognize that computer system 800 may establish connections to multiple servers on internet 828. Each such server includes an internet application such as an HTML- or XML-based application, which may provide information to computer system 800 upon request in a manner consistent with the present invention.

The system architecture just described is exemplary. One of ordinary skill in the art could easily substitute, replace, add or eliminate various components without departing from the principles of the present invention. For example, the various networks and communication paths described could be implemented using DSL, cable, wireless, and/or Internet technology in place of the technology described.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for issuing and servicing a home appreciation participation note (HAPN) for a real estate property, comprising:
   initiating a participation contract (PC) for the real estate property, and issuing the PC to a PC investor for a PC price;
   specifying, for a valuation of the PC, a proxy and a set of sharing formulae, a payoff value of the PC at a time of a settlement of the HAPN being specified by the set of sharing formulae using a value of the proxy at the settlement time, the value of the proxy at the settlement time being ascertainable by running an automated valuation model (AVM) on a computer using a plurality of attributes specific to the real estate property, the plurality of attributes being of a condition of the real estate property prior to the settlement time, and being independent of an actual condition of the real estate property at the settlement time; and
   issuing a HAPN Bond for the real estate property to a HAPN Bond investor, the HAPN Bond having an initial value being a sum of the PC price and a discounted amount of the initial value of the HAPN Bond; wherein
   both the PC and the HAPN Bond represent claims on the real estate property, and are paid off respectively to the PC and HAPN Bond investors at the settlement time;
   a payoff amount of the PC to the PC investor at the settlement time corresponds to the payoff value of the PC at the settlement time; and
   a payoff amount of the HAPN Bond to the HAPN Bond investor at the settlement time is the initial value of the HAPN Bond if the payoff value of the PC at the settlement time is not negative, and is a remaining portion of the initial value, after deducting the absolute value of the payoff value of the PC at the settlement time, if the payoff value of the PC at the settlement time is negative.

2. The method of claim 1, wherein the value of the proxy is ascertainable by running a combination of AVMs on the computer.

3. The method of claim 1, further comprising treating a given time as the settlement time, and observing the payoff amount of the PC and the payoff amount of the HAPN Bond at the given time for monitoring, reporting or settlement.

4. The method of claim 3, wherein the given time is a current time, and the observing comprises calculating a current intrinsic payoff value of the PC.

5. The method of claim 4, wherein the calculating includes:
   obtaining an initial value of the proxy at a time of the initiating the PC;
   obtaining a current value of the proxy that is the value of the proxy at the current time; and
   calculating the current intrinsic payoff value of the PC using the pre-specified set of sharing formulae based on a difference between the current value and the initial value of the proxy divided by the initial value of the proxy.

6. The method of claim 5, wherein the obtaining an initial value includes using one of an initial price of the real estate property and an appraised value of the real estate property as the initial value of the proxy, and obtaining the current value includes using an estimate from the AVM as the current value of the proxy.

7. The method of claim 5, wherein the obtaining an initial value and the obtaining a current value of the proxy include using initial attributes of the real estate property in the AVM to obtain the initial value and the current value of the proxy.

8. The method of claim 7, further comprising:
pre-storing the initial attributes in at least one of a read-only memory of the computer and a static storage device;
loading the pre-stored initial attributes into a dynamic memory;
accessing the dynamic memory with a CPU to fetch the initial attributes; and
calculating with the CPU one of the initial value and the current value of the proxy using the fetched initial attributes.

9. The method of claim 5, wherein the obtaining an initial value and the obtaining a current value include using current attributes of the real estate property in the AVM to obtain the initial value and the current value of the proxy.

10. The method of claim 9, further comprising:
loading the current attributes into a dynamic memory of the computer;
accessing the dynamic memory with a CPU to fetch the current attributes; and
calculating one of the initial value and the current value of the proxy with the CPU using the fetched current attributes.

11. The method of claim 1, further comprising:
pre-storing the pre-specified set of sharing formulae in at least one of a read-only memory of the computer and a static storage device;
loading the pre-stored set of sharing formulae into a dynamic memory;
accessing the dynamic memory with a CPU to fetch the set of sharing formulae; and
calculating with the CPU the payoff value of the PC using the fetched set of sharing formulae.

12. The method of claim 1, further comprising specifying a condition to trigger the settlement of the HAPN.

13. The method of claim 12, wherein the condition includes at least one of a change in an ownership of the real estate property, a default on terms of a contract of the HAPN, an option of an issuer with a minimum payment of a nominal value of the HAPN Bond, an option of an issuer after a specified period of time including a pre-specified prepayment penalty, a prepayment of other mortgages on the real estate property, and a fixed maturity.

14. The method of claim 12, further comprising specifying at least one of the PC and the HAPN Bond investors has the option not to allow the settlement if the real estate property is not sold.

15. The method of claim 1, further comprising:
monitoring statuses of the PC and the HAPN Bond; and
generating a status report for at least one of an owner of the real estate property, the PC investor and the HAPN Bond investor.

16. The method of claim 15, wherein the status report includes periodic status reports.

17. The method of claim 1, wherein the HAPN Bond has a non-negative accrual coupon and a non-negative payment coupon.

18. The method of claim 1, wherein the HAPN Bond has a zero accrual coupon and a zero payment coupon.

19. The method of claim 1, wherein the PC and the HAPN Bond are held by a same investor.

20. The method of claim 1, wherein at least one of the HAPN Bond and the PC are pooled and securitized.

21. The method of claim 1, further comprising:
calculating an imputed settlement value of the real estate property using the proxy;
deducting an appraised value of improvements made by an owner of the real estate property during a duration of a contract for the HAPN from the imputed settlement value; and
using the imputed settlement value after the deduction as a settlement value of the real estate property.

22. The method of claim 1, further comprising specifying in the PC that, when a settlement value of the proxy differs from an actual selling price of the estate real property by a pre-specified amount, the payoff amount of the PC is modified.

23. The method of claim 1, wherein the PC has a first lien position, the HAPN Bond has a second lien position, and a traditional mortgage on the real estate property has a third lien position.

24. The method of claim 1, wherein a traditional mortgage on the real estate property has a first lien position, the PC has a second lien position, and the HAPN Bond has a third lien position.

25. The method of claim 1, wherein the PC and the HAPN Bond are combined into one mortgage along with a traditional mortgage, and the combined PC and HAPN Bond has a first lien position.

26. A computer-implemented method for issuing and servicing a home appreciation participation note (HAPN) for a real estate property, comprising:
initiating a participation contract (PC) for the real estate property, and issuing the PC to a PC investor for a PC price;
specifying, for a valuation of the PC, a proxy and a set of sharing formulae, a payoff value of the PC at a settlement time of the HAPN being specified by the set of sharing formulae using a value of the proxy at the settlement time, the value of the proxy at the settlement time being ascertainable by using a plurality of attributes specific to the real estate property, the plurality of attributes being of a condition of the real estate property prior to the settlement time, and being independent of an actual condition of the real estate property at the settlement time; and
issuing a HAPN Bond for the real estate property to a HAPN Bond investor, the HAPN Bond having an initial value being a sum of the PC price and a discounted amount of the initial value of the HAPN Bond; wherein
both the PC and the HAPN Bond represent claims on the real estate property, and are paid off respectively to the PC and HAPN Bond investors at the settlement time;
a payoff amount of the PC to the PC investor at the settlement time corresponds to the payoff value of the PC at the settlement time; and
a payoff amount of the HAPN Bond to the HAPN Bond investor at the settlement time is the initial value of the HAPN Bond if the payoff value of the PC at the settlement time is not negative, and is a remaining portion of the initial value, after deducting the absolute value of the payoff value of the PC at the settlement time, if the payoff value of the PC at the settlement time is negative.

27. The method of claim 26, wherein the value of the proxy is ascertainable using a desk valuation.

28. The method of claim 27, wherein the using a desk valuation includes using one of a desk review, an automated valuation model (AVM), and a combination of AVMs.

29. The method of claim 26, further comprising treating a given time as the settlement time, and observing the payoff amount of the PC and the payoff amount of the HAPN Bond at the given time for monitoring, reporting or settlement.

30. The method of claim 29, wherein the given time is a current time, and the observing comprises calculating a current intrinsic payoff value of the PC.

31. The method of claim 30, wherein the calculating includes:
   obtaining an initial value of the proxy at a time of the initiating the PC;
   obtaining a current value of the proxy that is the value of the proxy at the current time; and
   calculating the current intrinsic payoff value of the PC using the pre-specified set of sharing formulae based on a difference between the current value and the initial value of the proxy divided by the initial value of the proxy.

32. The method of claim 31, wherein the obtaining an initial value includes using one of an initial price of the real estate property, an appraised value of the real estate property and an estimate from an AVM as the initial value of the proxy.

33. The method of claim 31, wherein the specifying includes using an AVM to obtain the proxy, and the obtaining an initial value and the obtaining a current value of the proxy include using initial attributes of the real estate property in the AVM to obtain the initial value and the current value of the proxy.

34. The method of claim 33, further comprising:
   pre-storing the initial attributes in at least one of a read-only memory of a computer and a static storage device;
   loading the pre-stored initial attributes into a dynamic memory;
   accessing the dynamic memory with a CPU to fetch the initial attributes; and
   calculating with the CPU one of the initial value and the current value of the proxy using the fetched initial attributes.

35. The method of claim 31, wherein the specifying includes using an AVM to obtain the proxy, and the obtaining an initial value and the obtaining a current value include using current attributes of the real estate property in the AVM to obtain the initial value and the current value of the proxy.

36. The method of claim 35, further comprising:
   loading the current attributes into a dynamic memory of a computer;
   accessing the dynamic memory with a CPU to fetch the current attributes; and
   calculating one of the initial value and the current value of the proxy with the CPU using the fetched current attributes.

37. The method of claim 26, further comprising:
   pre-storing the pre-specified set of sharing formulae in at least one of a read-only memory of a computer and a static storage device;
   loading the pre-stored set of sharing formulae into a dynamic memory;
   accessing the dynamic memory with a CPU to fetch the set of sharing formulae; and
   calculating with the CPU the payoff value of the PC using the fetched set of sharing formulae.

38. The method of claim 26, further comprising specifying a condition to trigger the settlement of the HAPN.

39. The method of claim 38, wherein the condition includes at least one of a change in an ownership of the real estate property, a default on terms of a contract of the HAPN, an option of an issuer with a minimum payment of a nominal value of the HAPN Bond, an option of an issuer after a specified period of time including a pre-specified prepayment penalty, a prepayment of other mortgages on the real estate property, and a fixed maturity.

40. The method of claim 38, further comprising specifying that at least one of the PC and the HAPN Bond investors has the option not to allow the settlement if the real estate property is not sold.

41. The method of claim 26, further comprising:
   monitoring statuses of the PC and the HAPN Bond; and
   generating a status report for at least one of an owner of the real estate property, the PC investor and the HAPN Bond investor.

42. The method of claim 41, wherein the status report includes periodic status reports.

43. The method of claim 41, wherein the status report is based on an AVM when a settlement value of the PC is based on a desk appraisal.

44. The method of claim 26, wherein the HAPN Bond has a non-negative accrual coupon and a non-negative payment coupon.

45. The method of claim 26, wherein the HAPN Bond has a zero accrual coupon and a zero payment coupon.

46. The method of claim 26, wherein the PC and the HAPN Bond are held by a same investor.

47. The method of claim 26, wherein at least one of the HAPN Bond and the PC are pooled and securitized.

48. The method of claim 26, further comprising:
   calculating an imputed settlement value of the real estate property using the proxy;
   deducting an appraised value of improvements made by an owner of the real estate property during a duration of a contract for the HAPN from the imputed settlement value; and
   using the imputed settlement value after the deduction as a settlement value of the real estate property.

49. The method of claim 26, further comprising specifying in the PC that, when a settlement value of the proxy differs from an actual selling price of the estate real property by a pre-specified amount, the payoff amount of the PC is modified.

50. The method of claim 26, wherein the PC has a first lien position, the HAPN Bond has a second lien position, and a traditional mortgage on the real estate property has a third lien position.

51. The method of claim 26, wherein a traditional mortgage on the real estate property has a first lien position, the PC has a second lien position, and the HAPN Bond has a third lien position.

52. The method of claim 26, wherein the PC and the HAPN Bond are combined into one mortgage along with a traditional mortgage, and the combined PC and HAPN Bond has a first lien position.

53. A computer program product for issuing and servicing a home appreciation participation note (HAPN) for a real estate property, the computer program product comprising:
   a non-transitory computer readable medium having instructions embodied therewith for causing a computer to execute a method comprising:
      initiating a participation contract (PC) for the real estate property, and issuing the PC to a PC investor for a PC price;
      specifying, for a valuation of the PC, a proxy and a set of sharing formulae, a payoff value of the PC at a settlement time of the HAPN being specified by the set of sharing formulae using a value of the proxy at the settlement time, the value of the proxy at the settlement time being ascertainable by using a plurality of attributes specific to the real estate property, the plurality of attributes being of a condition of the real estate property prior to the settlement time, and being independent of an actual condition of the real estate property at the settlement time; and issuing a HAPN Bond for the real estate property to a HAPN Bond investor, the HAPN Bond having an initial value being a sum of the PC price and a discounted amount of the initial value of the HAPN Bond; wherein both the PC and the HAPN Bond represent claims on the real estate property, and are paid off respectively to the PC and HAPN Bond investors at the settlement time;

a payoff amount of the PC to the PC investor at the settlement time corresponds to the payoff value of the PC at the settlement time; and a payoff amount of the HAPN Bond to the HAPN Bond investor at the settlement time is the initial value of the HAPN Bond if the payoff value of the PC at the settlement time is not negative, and is a remaining portion of the initial value, after deducting the absolute value of the payoff value of the PC at the settlement time, if the payoff value of the PC at the settlement is negative.

54. A computer system comprising:

a processor;

a memory operatively coupled with the processor;

a storage device operatively coupled with the processor and the memory; and a computer program product for issuing and servicing a home appreciation participation note (HAPN) for a real estate property, the computer program product comprising:

a non-transitory computer readable medium having instructions embodied therewith for causing the processor to execute a method comprising:

initiating a participation contract (PC) for the real estate property, and issuing the PC to a PC investor for a PC price;

specifying, for a valuation of the PC, a proxy and a set of sharing formulae, a payoff value of the PC at a settlement time of the HAPN being specified by the set of sharing formulae using a value of the proxy at the settlement time, the value of the proxy at the settlement time being ascertainable by using a plurality of attributes specific to the real estate property, the plurality of attributes being of a condition of the real estate property prior to the settlement time, and being independent of an actual condition of the real estate property at the settlement time; and issuing a HAPN Bond for the real estate property to a HAPN Bond investor, the HAPN Bond having an initial value being a sum of the PC price and a discounted amount of the initial value of the HAPN Bond; wherein both the PC and the HAPN Bond represent claims on the real estate property, and are paid off respectively to the PC and HAPN Bond investors at the settlement time;

a payoff amount of the PC to the PC investor at the settlement time corresponds to the payoff value of the PC at the settlement time; and a payoff amount of the HAPN Bond to the HAPN Bond investor at the settlement time is the initial value of the HAPN Bond if the payoff value of the PC at the settlement time is not negative, and is a remaining portion of the initial value, after deducting the absolute value of the payoff value of the PC at the settlement time, if the payoff value of the PC at the settlement time is negative.

* * * * *